US012307938B2

(12) United States Patent
Shin et al.

(10) Patent No.: US 12,307,938 B2
(45) Date of Patent: May 20, 2025

(54) DISPLAY APPARATUS, METHOD OF DRIVING DISPLAY PANEL USING THE SAME AND ELECTRONIC APPARATUS INCLUDING THE SAME

(71) Applicant: Samsung Display Co., LTD., Yongin-si (KR)

(72) Inventors: Jongha Shin, Yongin-si (KR); Daye Moon, Yongin-si (KR); Kitae Yoon, Yongin-si (KR); Kyoungho Lim, Yongin-si (KR); Wonwoo Jang, Yongin-si (KR); Yooshin Chon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/435,514

(22) Filed: Feb. 7, 2024

(65) Prior Publication Data

US 2024/0386828 A1 Nov. 21, 2024

(30) Foreign Application Priority Data

May 15, 2023 (KR) ........................ 10-2023-0062722

(51) Int. Cl.
*G09G 3/20* (2006.01)

(52) U.S. Cl.
CPC ..... *G09G 3/2007* (2013.01); *G09G 2310/027* (2013.01); *G09G 2320/0686* (2013.01); *G09G 2354/00* (2013.01); *G09G 2360/145* (2013.01); *G09G 2360/16* (2013.01)

(58) Field of Classification Search
CPC ........... G09G 3/2007; G09G 2310/027; G09G 2354/00
See application file for complete search history.

(56) References Cited

U.S. PATENT DOCUMENTS

| | | | | |
|---|---|---|---|---|
| 2019/0139470 | A1* | 5/2019 | Yoo | H04N 13/133 |
| 2019/0139478 | A1 | 5/2019 | Jang | |
| 2020/0074900 | A1 | 3/2020 | Zhang et al. | |
| 2020/0410940 | A1* | 12/2020 | Kim | G09G 3/3275 |
| 2021/0241719 | A1* | 8/2021 | Choi | G09G 3/2003 |
| 2022/0165200 | A1 | 5/2022 | Park et al. | |

FOREIGN PATENT DOCUMENTS

| | | | |
|---|---|---|---|
| KR | 1020090071683 | A | 7/2009 |
| KR | 1020190048477 | A | 5/2019 |

* cited by examiner

*Primary Examiner* — Lisa S Landis
(74) *Attorney, Agent, or Firm* — CANTOR COLBURN LLP

(57) ABSTRACT

A display apparatus includes a display panel and a display panel driver. The display panel driver drives the display panel. The display panel driver determines at least one selected from a first low luminance pattern and a second low luminance pattern, where the first lower luminance pattern includes a first low luminance area at a first end portion of the display panel in a vertical direction and a second low luminance area at a second end portion of the display panel in the vertical direction, and the second low luminance pattern includes a third low luminance area at a first end portion of the display panel in a horizontal direction and a fourth low luminance area at a second end portion of the display panel in the horizontal direction. The display panel driver determines a compensation area including a boundary between a low luminance area and a normal area.

27 Claims, 22 Drawing Sheets

FIG. 5

| | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|
| R1 | BL1 | BL19 | BL37 | BL55 | BL73 | BL91 | BL109 | BL127 | BL145 | BL163 | BL181 | BL199 | BL217 | BL235 | BL253 | BL271 |
| R2 | BL2 | BL20 | BL38 | BL56 | BL74 | BL92 | BL110 | BL128 | BL146 | BL164 | BL182 | BL200 | BL218 | BL236 | BL254 | BL272 |
| R3 | BL3 | BL21 | BL39 | BL57 | BL75 | BL93 | BL111 | BL129 | BL147 | BL165 | BL183 | BL201 | BL219 | BL237 | BL255 | BL273 |
| R4 | BL4 | BL22 | BL40 | BL58 | BL76 | BL94 | BL112 | BL130 | BL148 | BL166 | BL184 | BL202 | BL220 | BL238 | BL256 | BL274 |
| R5 | BL5 | BL23 | BL41 | BL59 | BL77 | BL95 | BL113 | BL131 | BL149 | BL167 | BL185 | BL203 | BL221 | BL239 | BL257 | BL275 |
| R6 | BL6 | BL24 | BL42 | BL60 | BL78 | BL96 | BL114 | BL132 | BL150 | BL168 | BL186 | BL204 | BL222 | BL240 | BL258 | BL276 |
| R7 | BL7 | BL25 | BL43 | BL61 | BL79 | BL97 | BL115 | BL133 | BL151 | BL169 | BL187 | BL205 | BL223 | BL241 | BL259 | BL277 |
| R8 | BL8 | BL26 | BL44 | BL62 | BL80 | BL98 | BL116 | BL134 | BL152 | BL170 | BL188 | BL206 | BL224 | BL242 | BL260 | BL278 |
| R9 | BL9 | BL27 | BL45 | BL63 | BL81 | BL99 | BL117 | BL135 | BL153 | BL171 | BL189 | BL207 | BL225 | BL243 | BL261 | BL279 |
| R10 | BL10 | BL28 | BL46 | BL64 | BL82 | BL100 | BL118 | BL136 | BL154 | BL172 | BL190 | BL208 | BL226 | BL244 | BL262 | BL280 |
| R11 | BL11 | BL29 | BL47 | BL65 | BL83 | BL101 | BL119 | BL137 | BL155 | BL173 | BL191 | BL209 | BL227 | BL245 | BL263 | BL281 |
| R12 | BL12 | BL30 | BL48 | BL66 | BL84 | BL102 | BL120 | BL138 | BL156 | BL174 | BL192 | BL210 | BL228 | BL246 | BL264 | BL282 |
| R13 | BL13 | BL31 | BL49 | BL67 | BL85 | BL103 | BL121 | BL139 | BL157 | BL175 | BL193 | BL211 | BL229 | BL247 | BL265 | BL283 |
| R14 | BL14 | BL32 | BL50 | BL68 | BL86 | BL104 | BL122 | BL140 | BL158 | BL176 | BL194 | BL212 | BL230 | BL248 | BL266 | BL284 |
| R15 | BL15 | BL33 | BL51 | BL69 | BL87 | BL105 | BL123 | BL141 | BL159 | BL177 | BL195 | BL213 | BL231 | BL249 | BL267 | BL285 |
| R16 | BL16 | BL34 | BL52 | BL70 | BL88 | BL106 | BL124 | BL142 | BL160 | BL178 | BL196 | BL214 | BL232 | BL250 | BL268 | BL286 |
| R17 | BL17 | BL35 | BL53 | BL71 | BL89 | BL107 | BL125 | BL143 | BL161 | BL179 | BL197 | BL215 | BL233 | BL251 | BL269 | BL287 |
| R18 | BL18 | BL36 | BL54 | BL72 | BL90 | BL108 | BL126 | BL144 | BL162 | BL180 | BL198 | BL216 | BL234 | BL252 | BL270 | BL288 |

D1
D2

FIG. 6

| | | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|---|
| LLA1 | R1 | 29 | 29 | 29 | 29 | 29 | 29 | 29 | 29 | 29 | 29 | 29 | 29 | 29 | 29 | 29 | 29 |
| | R2 | 0 | 0 | 0 | 0 | 0 | 0 | 0 | 0 | 0 | 0 | 0 | 0 | 0 | 0 | 0 | 0 |
| | R3 | 0 | 0 | 0 | 0 | 0 | 0 | 0 | 0 | 0 | 0 | 0 | 0 | 0 | 0 | 0 | 0 |
| | R4 | 0 | 0 | 0 | 0 | 0 | 0 | 0 | 0 | 0 | 0 | 0 | 0 | 0 | 0 | 0 | 0 |
| | R5 | 0 | 0 | 0 | 0 | 0 | 0 | 0 | 0 | 0 | 0 | 0 | 0 | 0 | 0 | 0 | 0 |
| | R6 | 0 | 0 | 0 | 0 | 0 | 0 | 0 | 0 | 0 | 0 | 0 | 0 | 0 | 0 | 0 | 0 |
| | R7 | 0 | 0 | 0 | 0 | 0 | 0 | 0 | 0 | 0 | 0 | 0 | 0 | 0 | 0 | 0 | 0 |
| | R8 | 0 | 0 | 0 | 0 | 0 | 0 | 0 | 0 | 0 | 0 | 0 | 0 | 0 | 0 | 0 | 0 |
| | R9 | 0 | 0 | 0 | 0 | 0 | 0 | 0 | 0 | 0 | 0 | 0 | 0 | 0 | 0 | 0 | 0 |
| | R10 | 0 | 0 | 0 | 0 | 0 | 0 | 0 | 0 | 0 | 0 | 0 | 0 | 0 | 0 | 0 | 0 |
| | R11 | 0 | 0 | 0 | 0 | 0 | 0 | 0 | 0 | 0 | 0 | 0 | 0 | 0 | 0 | 0 | 0 |
| | R12 | 0 | 0 | 0 | 0 | 0 | 0 | 0 | 0 | 0 | 0 | 0 | 0 | 0 | 0 | 0 | 0 |
| | R13 | 0 | 0 | 0 | 0 | 0 | 0 | 0 | 0 | 0 | 0 | 0 | 0 | 0 | 0 | 0 | 0 |
| | R14 | 0 | 0 | 0 | 0 | 0 | 0 | 0 | 0 | 0 | 0 | 0 | 0 | 0 | 0 | 0 | 0 |
| | R15 | 0 | 0 | 0 | 0 | 0 | 0 | 0 | 0 | 0 | 0 | 0 | 0 | 0 | 0 | 0 | 0 |
| | R16 | 0 | 0 | 0 | 0 | 0 | 0 | 0 | 0 | 0 | 0 | 0 | 0 | 0 | 0 | 0 | 0 |
| | R17 | 0 | 0 | 0 | 0 | 0 | 0 | 0 | 0 | 0 | 0 | 0 | 0 | 0 | 0 | 0 | 0 |
| LLA2 | R18 | 29 | 29 | 29 | 29 | 29 | 29 | 29 | 29 | 29 | 29 | 29 | 29 | 29 | 29 | 29 | 29 |

FIG. 7A

| | | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|---|
| CA1 | R1 | G2 | G2 | G2 | G2 | G2 | G2 | G2 | G2 | G2 | G2 | G2 | G2 | G2 | G2 | G2 | G2 |
| CA1 | R2 | G2 | G2 | G2 | G2 | G2 | G2 | G2 | G2 | G2 | G2 | G2 | G2 | G2 | G2 | G2 | G2 |
| CA1 | R3 | G1 | G1 | G1 | G1 | G1 | G1 | G1 | G1 | G1 | G1 | G1 | G1 | G1 | G1 | G1 | G1 |
| | R4 | 1 | 1 | 1 | 1 | 1 | 1 | 1 | 1 | 1 | 1 | 1 | 1 | 1 | 1 | 1 | 1 |
| | R5 | 1 | 1 | 1 | 1 | 1 | 1 | 1 | 1 | 1 | 1 | 1 | 1 | 1 | 1 | 1 | 1 |
| | R6 | 1 | 1 | 1 | 1 | 1 | 1 | 1 | 1 | 1 | 1 | 1 | 1 | 1 | 1 | 1 | 1 |
| | R7 | 1 | 1 | 1 | 1 | 1 | 1 | 1 | 1 | 1 | 1 | 1 | 1 | 1 | 1 | 1 | 1 |
| | R8 | 1 | 1 | 1 | 1 | 1 | 1 | 1 | 1 | 1 | 1 | 1 | 1 | 1 | 1 | 1 | 1 |
| | R9 | 1 | 1 | 1 | 1 | 1 | 1 | 1 | 1 | 1 | 1 | 1 | 1 | 1 | 1 | 1 | 1 |
| | R10 | 1 | 1 | 1 | 1 | 1 | 1 | 1 | 1 | 1 | 1 | 1 | 1 | 1 | 1 | 1 | 1 |
| | R11 | 1 | 1 | 1 | 1 | 1 | 1 | 1 | 1 | 1 | 1 | 1 | 1 | 1 | 1 | 1 | 1 |
| | R12 | 1 | 1 | 1 | 1 | 1 | 1 | 1 | 1 | 1 | 1 | 1 | 1 | 1 | 1 | 1 | 1 |
| | R13 | 1 | 1 | 1 | 1 | 1 | 1 | 1 | 1 | 1 | 1 | 1 | 1 | 1 | 1 | 1 | 1 |
| | R14 | 1 | 1 | 1 | 1 | 1 | 1 | 1 | 1 | 1 | 1 | 1 | 1 | 1 | 1 | 1 | 1 |
| | R15 | 1 | 1 | 1 | 1 | 1 | 1 | 1 | 1 | 1 | 1 | 1 | 1 | 1 | 1 | 1 | 1 |
| CA2 | R16 | G1 | G1 | G1 | G1 | G1 | G1 | G1 | G1 | G1 | G1 | G1 | G1 | G1 | G1 | G1 | G1 |
| CA2 | R17 | G2 | G2 | G2 | G2 | G2 | G2 | G2 | G2 | G2 | G2 | G2 | G2 | G2 | G2 | G2 | G2 |
| CA2 | R18 | G2 | G2 | G2 | G2 | G2 | G2 | G2 | G2 | G2 | G2 | G2 | G2 | G2 | G2 | G2 | G2 |

FIG. 10

| | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|
| R1 | 29 | 29 | 29 | 29 | 0 | 0 | 0 | 0 | 0 | 0 | 0 | 0 | 29 | 29 | 29 | 29 |
| R2 | 29 | 29 | 29 | 29 | 0 | 0 | 0 | 0 | 0 | 0 | 0 | 0 | 29 | 29 | 29 | 29 |
| R3 | 29 | 29 | 29 | 29 | 0 | 0 | 0 | 0 | 0 | 0 | 0 | 0 | 29 | 29 | 29 | 29 |
| R4 | 29 | 29 | 29 | 29 | 0 | 0 | 0 | 0 | 0 | 0 | 0 | 0 | 29 | 29 | 29 | 29 |
| R5 | 29 | 29 | 29 | 29 | 0 | 0 | 0 | 0 | 0 | 0 | 0 | 0 | 29 | 29 | 29 | 29 |
| R6 | 29 | 29 | 29 | 29 | 0 | 0 | 0 | 0 | 0 | 0 | 0 | 0 | 29 | 29 | 29 | 29 |
| R7 | 29 | 29 | 29 | 29 | 0 | 0 | 0 | 0 | 0 | 0 | 0 | 0 | 29 | 29 | 29 | 29 |
| R8 | 29 | 29 | 29 | 29 | 0 | 0 | 0 | 0 | 0 | 0 | 0 | 0 | 29 | 29 | 29 | 29 |
| R9 | 29 | 29 | 29 | 29 | 0 | 0 | 0 | 0 | 0 | 0 | 0 | 0 | 29 | 29 | 29 | 29 |
| R10 | 29 | 29 | 29 | 29 | 0 | 0 | 0 | 0 | 0 | 0 | 0 | 0 | 29 | 29 | 29 | 29 |
| R11 | 29 | 29 | 29 | 29 | 0 | 0 | 0 | 0 | 0 | 0 | 0 | 0 | 29 | 29 | 29 | 29 |
| R12 | 29 | 29 | 29 | 29 | 0 | 0 | 0 | 0 | 0 | 0 | 0 | 0 | 29 | 29 | 29 | 29 |
| R13 | 29 | 29 | 29 | 29 | 0 | 0 | 0 | 0 | 0 | 0 | 0 | 0 | 29 | 29 | 29 | 29 |
| R14 | 29 | 29 | 29 | 29 | 0 | 0 | 0 | 0 | 0 | 0 | 0 | 0 | 29 | 29 | 29 | 29 |
| R15 | 29 | 29 | 29 | 29 | 0 | 0 | 0 | 0 | 0 | 0 | 0 | 0 | 29 | 29 | 29 | 29 |
| R16 | 29 | 29 | 29 | 29 | 0 | 0 | 0 | 0 | 0 | 0 | 0 | 0 | 29 | 29 | 29 | 29 |
| R17 | 29 | 29 | 29 | 29 | 0 | 0 | 0 | 0 | 0 | 0 | 0 | 0 | 29 | 29 | 29 | 29 |
| R18 | 29 | 29 | 29 | 29 | 0 | 0 | 0 | 0 | 0 | 0 | 0 | 0 | 29 | 29 | 29 | 29 |

LLA3 (C1–C4) LLA4 (C13–C16)

FIG. 11A

| | C1 | C2 | C3 | C4 | C5 | C6 | C7 | C8 | C9 | C10 | C11 | C12 | C13 | C14 | C15 | C16 |
|---|---|---|---|---|---|---|---|---|---|---|---|---|---|---|---|---|
| R1 | G2 | G2 | G2 | G2 | G2 | G1 | 1 | 1 | 1 | 1 | G1 | G2 | G2 | G2 | G2 | G2 |
| R2 | G2 | G2 | G2 | G2 | G2 | G1 | 1 | 1 | 1 | 1 | G1 | G2 | G2 | G2 | G2 | G2 |
| R3 | G2 | G2 | G2 | G2 | G2 | G1 | 1 | 1 | 1 | 1 | G1 | G2 | G2 | G2 | G2 | G2 |
| R4 | G2 | G2 | G2 | G2 | G2 | G1 | 1 | 1 | 1 | 1 | G1 | G2 | G2 | G2 | G2 | G2 |
| R5 | G2 | G2 | G2 | G2 | G2 | G1 | 1 | 1 | 1 | 1 | G1 | G2 | G2 | G2 | G2 | G2 |
| R6 | G2 | G2 | G2 | G2 | G2 | G1 | 1 | 1 | 1 | 1 | G1 | G2 | G2 | G2 | G2 | G2 |
| R7 | G2 | G2 | G2 | G2 | G2 | G1 | 1 | 1 | 1 | 1 | G1 | G2 | G2 | G2 | G2 | G2 |
| R8 | G2 | G2 | G2 | G2 | G2 | G1 | 1 | 1 | 1 | 1 | G1 | G2 | G2 | G2 | G2 | G2 |
| R9 | G2 | G2 | G2 | G2 | G2 | G1 | 1 | 1 | 1 | 1 | G1 | G2 | G2 | G2 | G2 | G2 |
| R10 | G2 | G2 | G2 | G2 | G2 | G1 | 1 | 1 | 1 | 1 | G1 | G2 | G2 | G2 | G2 | G2 |
| R11 | G2 | G2 | G2 | G2 | G2 | G1 | 1 | 1 | 1 | 1 | G1 | G2 | G2 | G2 | G2 | G2 |
| R12 | G2 | G2 | G2 | G2 | G2 | G1 | 1 | 1 | 1 | 1 | G1 | G2 | G2 | G2 | G2 | G2 |
| R13 | G2 | G2 | G2 | G2 | G2 | G1 | 1 | 1 | 1 | 1 | G1 | G2 | G2 | G2 | G2 | G2 |
| R14 | G2 | G2 | G2 | G2 | G2 | G1 | 1 | 1 | 1 | 1 | G1 | G2 | G2 | G2 | G2 | G2 |
| R15 | G2 | G2 | G2 | G2 | G2 | G1 | 1 | 1 | 1 | 1 | G1 | G2 | G2 | G2 | G2 | G2 |
| R16 | G2 | G2 | G2 | G2 | G2 | G1 | 1 | 1 | 1 | 1 | G1 | G2 | G2 | G2 | G2 | G2 |
| R17 | G2 | G2 | G2 | G2 | G2 | G1 | 1 | 1 | 1 | 1 | G1 | G2 | G2 | G2 | G2 | G2 |
| R18 | G2 | G2 | G2 | G2 | G2 | G1 | 1 | 1 | 1 | 1 | G1 | G2 | G2 | G2 | G2 | G2 |

CA3 (C1–C6) CA4 (C11–C16)

DISPLAY APPARATUS, METHOD OF DRIVING DISPLAY PANEL USING THE SAME AND ELECTRONIC APPARATUS INCLUDING THE SAME

This application claims priority to Korean Patent Application No. 10-2023-0062722, filed on May 15, 2023, and all the benefits accruing therefrom under 35 U.S.C. § 119, the content of which in its entirety is herein incorporated by reference.

BACKGROUND

1. Field

Embodiments of the invention relate to a display apparatus, a method of driving a display panel using the display apparatus and an electronic apparatus including the display apparatus. More particularly, embodiments of the invention relate to a display apparatus in which an afterimage at a boundary between a low luminance area and a normal area that may occur when the low luminance areas are disposed on opposing sides of a display panel in a vertical direction or the low luminance areas are disposed on opposing sides of the display panel in a horizontal direction is reduced, a method of driving a display panel using the display apparatus and an electronic apparatus including the display apparatus.

2. Description of the Related Art

Generally, a display apparatus includes a display panel and a display panel driver. The display panel displays an image based on input image data. The display panel may include a plurality of gate lines, a plurality of data lines and a plurality of pixels. The display panel driver may include a gate driver, a data driver and a driving controller. The gate driver may output gate signals to the gate lines. The data driver may output data voltages to the data lines. The driving controller may control an operation of the gate driver and an operation of the data driver.

When a same image is displayed on the display panel for a long time, an afterimage may remain on the display panel. A shape of the afterimage may be determined according to a content of the input image data. When a resolution of the display panel and a resolution of the input image do not match each other, black images may be displayed on left and right portions or top and bottom portions of the display panel for a long time. In addition, in a specific mode of the display panel such as a movie, a game, or a sports match, black images may be displayed on left and right portions or top and bottom portions of the display panel for a long time.

SUMMARY

When black images are displayed on left and right portions or top and bottom portions of a display panel for a long time, a boundary line between the black image and a normal image may remain as an afterimage. When an image not including the black image is displayed on the left and right portions or the top and bottom portions of the display panel, the afterimage of the boundary line between the black image and the normal image may be shown to a user.

Embodiments of the invention provide a display apparatus in which an afterimage at a boundary between a low luminance area and a normal area is reduced.

Embodiments of the invention also provide a method of driving a display panel using the display apparatus.

Embodiments of the invention also provide an electronic apparatus including the display apparatus.

In an embodiment of a display apparatus according to the invention, the display apparatus includes a display panel and a display panel driver. In such an embodiment, the display panel driver drives the display panel. In such an embodiment, the display panel driver determines at least one selected from a first low luminance pattern and a second low luminance pattern, where the first low luminance pattern includes a first low luminance area at a first end portion of the display panel in a vertical direction and a second low luminance area at a second end portion of the display panel in the vertical direction, and a second low luminance pattern includes a third low luminance area at a first end portion of the display panel in a horizontal direction and a fourth low luminance area at a second end portion of the display panel in the horizontal direction. In such an embodiment, when the first low luminance pattern is determined, the display panel driver determines a first compensation area including a first boundary between the first low luminance area and a first normal area and a second compensation area including a second boundary between the second low luminance area and the first normal area and operates a compensation for reducing grayscale values of the first compensation area and the second compensation area. In such an embodiment, when the second low luminance pattern is determined, the display panel driver determines a third compensation area including a third boundary between the third low luminance area and a second normal area and a fourth compensation area including a fourth boundary between the fourth low luminance area and the second normal area and operates a compensation for reducing grayscale values of the third compensation area and the fourth compensation area.

In an embodiment, the display panel driver may determine at least one selected from the first low luminance pattern and the second low luminance pattern based on whether a grayscale value of a present frame of input image data is less than a grayscale threshold value.

In an embodiment, the display panel driver may divide the input image data into a plurality of blocks corresponding to the display panel. In such an embodiment, when an average grayscale value of a block among the plurality of blocks maintains below the grayscale threshold value for a predetermined time period, the display panel driver may determine the block as a low luminance block.

In an embodiment, when the average grayscale value of the block is less than the grayscale threshold value, the display panel driver may increase a block count value of the block. In such an embodiment, when the average grayscale value of the block is greater than or equal to the grayscale threshold value, the display panel driver may decrease the block count value of the block.

In an embodiment, when a number of the low luminance block in a block row is greater than or equal to a first number threshold value, the display panel driver may determine the block row as a low luminance block row.

In an embodiment, when low luminance block rows are symmetrically disposed at the first end portion of the display panel in the vertical direction and the second end portion of the display panel in the vertical direction, the first low luminance pattern may be determined.

In an embodiment, when a number of the low luminance block in a block column is greater than or equal to a second number threshold value, the display panel driver may determine the block column as a low luminance block column.

In an embodiment, when low luminance block columns are symmetrically disposed at the first end portion of the display panel in the horizontal direction and the second end portion of the display panel in the horizontal direction, the second low luminance pattern may be determined.

In an embodiment, the display panel driver may determine at least one selected from the first low luminance pattern and the second low luminance pattern based on whether a grayscale value of a present frame of input image data is less than a grayscale threshold value and whether an absolute value of a difference between the grayscale value of the present frame and a grayscale value of a previous frame is less than a grayscale difference threshold value.

In an embodiment, the display panel driver may determine at least one selected from the first low luminance pattern and the second low luminance pattern based on whether a grayscale value of a present frame of input image data is less than a grayscale threshold value and whether an image of the present frame of the input image data is not a predetermined exceptional pattern.

In an embodiment, when a uniformity of a grayscale histogram of the present frame of the input image data is less than a uniformity threshold value, the display panel driver may determine the image of the present frame as the predetermined exceptional pattern.

In an embodiment, the display panel driver may determine at least one selected from the first low luminance pattern and the second low luminance pattern based on whether a grayscale value of a present frame of input image data is less than a grayscale threshold value, whether an absolute value of a difference between the grayscale value of the present frame and a grayscale value of a previous frame is less than a grayscale difference threshold value and whether an image of the present frame of the input image data is not a predetermined exceptional pattern.

In an embodiment, a size of the first compensation area may be greater than a size of the first low luminance area. In such an embodiment, a size of the second compensation area may be greater than a size of the second low luminance area.

In an embodiment, a compensation degree in the first compensation area may gradually decrease as being away from the first boundary to the first normal area and may gradually decrease as being away from the second boundary to the first normal area.

In an embodiment, a size of the third compensation area may be greater than a size of the third low luminance area. In such an embodiment, a size of the fourth compensation area may be greater than a size of the fourth low luminance area.

In an embodiment, a compensation degree in the third compensation area may gradually decrease as being away from the third boundary to the second normal area and may gradually decrease as being away from the fourth boundary to the second normal area.

In an embodiment, the display panel driver may divide input image data into a plurality of blocks corresponding to the display panel. In such an embodiment, the display panel driver may determine whether each of the plurality of block is a low luminance block based on an average grayscale value thereof.

In an embodiment, the display panel driver may determine whether the low luminance blocks form at least one selected from a low luminance block row and a low luminance block column.

In an embodiment, when low luminance block rows are symmetrically disposed at the first end portion of the display panel in the vertical direction and the second end portion of the display panel in the vertical direction, the first low luminance pattern may be determined. In such an embodiment, when low luminance block columns are symmetrically disposed at the first end portion of the display panel in the horizontal direction and the second end portion of the display panel in the horizontal direction, the second low luminance pattern may be determined.

In an embodiment, the display panel driver may include a block operator which divides input image data into a plurality of blocks corresponding to the display panel and calculates an average grayscale value of each of the plurality of blocks, a low luminance area determiner which determines a low luminance area based on the average grayscale value of each of the plurality of blocks, a compensation determiner which determines at least one selected from the first low luminance pattern and the second low luminance pattern based on the low luminance area, and a luminance compensator which operates a compensation for reducing the grayscale values of the first compensation area and the second compensation area when the first low luminance pattern is determined and operates a compensation for reducing the grayscale values of the third compensation area and the fourth compensation area when the second low luminance pattern is determined.

In an embodiment, the display panel driver may further include a pixel shifter which periodically shifts the input image data in the horizontal direction of the display panel when the second low luminance pattern is determined.

In an embodiment, the display panel driver may include a block operator which divides input image data into a plurality of blocks corresponding to the display panel and calculates an average grayscale value of each of the plurality of blocks, a pattern determiner which determines whether the input image data represent a predetermined exceptional pattern, a low luminance area determiner which determines a low luminance area based on the average grayscale value of each of the plurality of blocks and whether the input image data represent the predetermined exceptional pattern, a compensation determiner which determines at least one selected from the first low luminance pattern and the second low luminance pattern based on the low luminance area, and a luminance compensator which operates a compensation for reducing the grayscale values of the first compensation area and the second compensation area when the first low luminance pattern is determined and operates a compensation for reducing the grayscale values of the third compensation area and the fourth compensation area when the second low luminance pattern is determined.

In an embodiment, the display panel driver may include a block operator which divides input image data into a plurality of blocks corresponding to the display panel and calculates an average grayscale value of each of the plurality of blocks, a low luminance area determiner which determines a low luminance area based on the average grayscale value of each of the plurality of blocks, a pattern determiner which determines whether the input image data represent a predetermined exceptional pattern, a compensation determiner which determine at least one selected from the first low luminance pattern and the second low luminance pattern based on the low luminance area and whether the input image data represent the predetermined exceptional pattern, and a luminance compensator which operates a compensation for reducing the grayscale values of the first compensation area and the second compensation area when the first low luminance pattern is determined and operates a compensation for reducing the grayscale values of the third compensation area and the fourth compensation area when the second low luminance pattern is determined.

In an embodiment of a display apparatus according to the invention, the display apparatus includes a display panel and a display panel driver. In such an embodiment, the display panel driver drives the display panel. In such an embodiment, the display panel driver determines a low luminance pattern including a first low luminance area at a first end portion of the display panel in a vertical direction and a second low luminance area at a second end portion of the display panel in the vertical direction. In such an embodiment, when the low luminance pattern is determined, the display panel driver determines a first compensation area including a first boundary between the first low luminance area and a normal area and a second compensation area including a second boundary between the second low luminance area and the normal area and operates a compensation for reducing grayscale values of the first compensation area and the second compensation area.

In an embodiment of a display apparatus according to the invention, the display apparatus includes a display panel and a display panel driver. In such an embodiment, the display panel driver drives the display panel. In such an embodiment, the display panel driver determines a low luminance pattern including a first low luminance area at a first end portion of the display panel in a horizontal direction and a second low luminance area at a second end portion of the display panel in the horizontal direction. In such an embodiment, when the low luminance pattern is determined, the display panel driver determines a first compensation area including a first boundary between the first low luminance area and a normal area and a second compensation area including a second boundary between the second low luminance area and the normal area and operates a compensation for reducing grayscale values of the first compensation area and the second compensation area.

In an embodiment of a method of driving a display panel according to the invention, the method includes determining at least one selected from a first low luminance pattern and a second low luminance pattern, where the first low luminance pattern includes a first low luminance area at a first end portion of the display panel in a vertical direction and a second low luminance area at a second end portion of the display panel in the vertical direction, and the second low luminance pattern includes a third low luminance area at a first end portion of the display panel in a horizontal direction and a fourth low luminance area at a second end portion of the display panel in the horizontal direction, determining at least one selected from a first low luminance pattern including a first low luminance area at a first end portion of the display panel in a vertical direction and a second low luminance area at a second end portion of the display panel in the vertical direction and a second low luminance pattern including a third low luminance area at a first end portion of the display panel in a horizontal direction and a fourth low luminance area at a second end portion of the display panel in the horizontal direction, and determining a third compensation area including a third boundary between the third low luminance area and a second normal area and a fourth compensation area including a fourth boundary between the fourth low luminance area and the second normal area and operating a compensation for reducing grayscale values of the third compensation area and the fourth compensation area when the second low luminance pattern is determined.

In an embodiment of an electronic apparatus according to the invention, the electronic apparatus includes an application processor, a display panel and a display panel driver. In such an embodiment, the display panel driver receives input image data from the application processor and drives the display panel. In such an embodiment, the display panel driver determines at least one selected from a first low luminance pattern and a second low luminance pattern, where the first low luminance pattern includes a first low luminance area at a first end portion of the display panel in a vertical direction and a second low luminance area at a second end portion of the display panel in the vertical direction, and the second low luminance pattern includes a third low luminance area at a first end portion of the display panel in a horizontal direction and a fourth low luminance area at a second end portion of the display panel in the horizontal direction. In such an embodiment, when the first low luminance pattern is determined, the display panel driver determines a first compensation area including a first boundary between the first low luminance area and a first normal area and a second compensation area including a second boundary between the second low luminance area and the first normal area and operates a compensation for reducing grayscale values of the first compensation area and the second compensation area. In such an embodiment, when the second low luminance pattern is determined, the display panel driver determines a third compensation area including a third boundary between the third low luminance area and a second normal area and a fourth compensation area including a fourth boundary between the fourth low luminance area and the second normal area and operates a compensation for reducing grayscale values of the third compensation area and the fourth compensation area.

According to embodiments of the display apparatus, the method of driving the display panel and the electronic apparatus including the display apparatus, the display panel driver may determine the low luminance pattern including the low luminance areas disposed on opposing sides of the display panel in the vertical direction or in the horizontal direction. In such an embodiment, when the display panel driver determines the low luminance pattern, the display panel driver may determine an area including the boundary between the low luminance area and the normal area as the compensation area and may operate a compensation for reducing the grayscale value of the compensation area.

In such embodiments, when the low luminance areas are disposed on opposing sides of the display panel in the vertical direction or in the horizontal direction, the luminance of the boundary between the low luminance area and the normal area may be reduced such that the afterimage occurred at the boundary between the low luminance area and the normal area may be reduced. Thus, the display quality of the display panel may be enhanced.

BRIEF DESCRIPTION OF THE DRAWINGS

The above and other features of embodiments of the invention will become more apparent by describing in detailed embodiments thereof with reference to the accompanying drawings, in which:

FIG. 5 is a diagram illustrating blocks of the display panel of FIG. 1;

FIG. 6 is a diagram illustrating block count values of the blocks corresponding to the image of FIG. 4;

FIGS. 7A and 7B are diagrams illustrating block compensation values of the blocks corresponding to the image of FIG. 4;

FIG. 10 is a diagram illustrating block count values of the blocks corresponding to the image of FIG. 9;

FIGS. 11A and 11B are diagrams illustrating block compensation values of the blocks corresponding to the image of FIG. 9;

DETAILED DESCRIPTION

Figure 1:
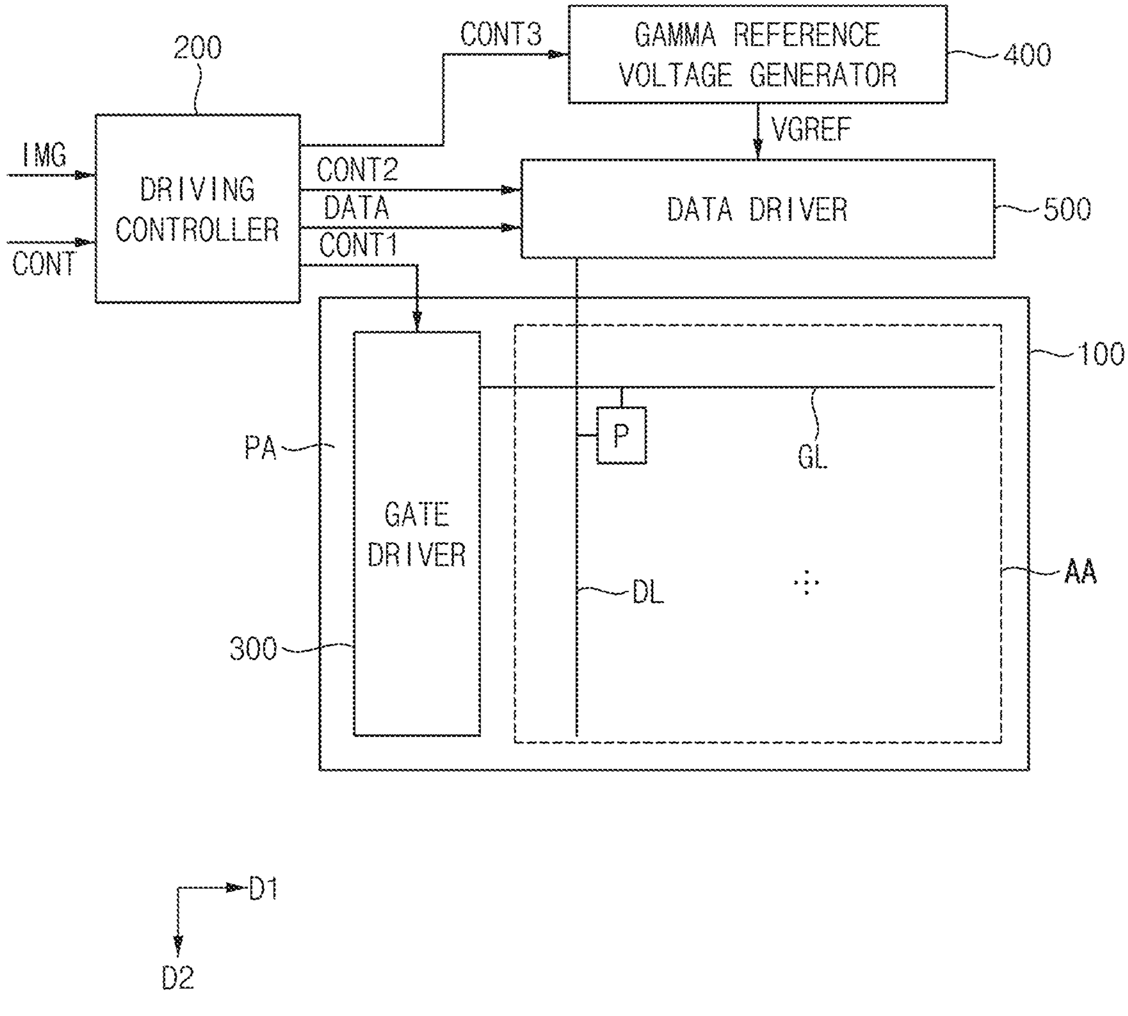
FIG. 1 is a block diagram illustrating a display apparatus according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display apparatus according to an embodiment of the invention.

Referring to FIG. 1, an embodiment of the display apparatus includes a display panel 100 and a display panel driver.

The display panel driver drives the display panel 100. The display panel driver may include a driving controller 200, a gate driver 300, a gamma reference voltage generator 400 and a data driver 500.

In an embodiment, for example, the driving controller 200 and the data driver 500 may be integrally formed as a single chip. In an embodiment, for example, the driving controller 200, the gamma reference voltage generator 400 and the data driver 500 may be integrally formed as a single chip. A driving module including at least the driving controller 200 and the data driver 500 which are integrally formed as a single chip may be referred to as a timing controller embedded data driver (TED).

In an embodiment, the display panel 100 has a display region AA on which an image is displayed and a peripheral region PA adjacent to the display region AA.

The display panel 100 may include a plurality of gate lines GL, a plurality of data lines DL and a plurality of pixels P connected to the gate lines GL and the data lines DL. The gate lines GL may extend in a first direction D1 and the data lines DL may extend in a second direction D2 crossing the first direction D1.

In an embodiment, the driving controller 200 receives input image data IMG and an input control signal CONT from an external apparatus (e.g. an application processor). In an embodiment, for example, the input image data IMG may include red image data, green image data and blue image data. In an embodiment, for example, the input image data IMG may include white image data. In an embodiment, for example, the input image data IMG may include magenta image data, yellow image data and cyan image data. The input control signal CONT may include a master clock signal and a data enable signal. The input control signal CONT may further include a vertical synchronizing signal and a horizontal synchronizing signal.

In an embodiment, the driving controller 200 generates a gate control signal CONT1, a data control signal CONT2, a gamma control signal CONT3 and a data signal DATA based on the input image data IMG and the input control signal CONT.

The driving controller 200 generates the gate control signal CONT1 for controlling an operation of the gate driver 300 based on the input control signal CONT, and outputs the gate control signal CONT1 to the gate driver 300. The gate control signal CONT1 may include a vertical start signal and a gate clock signal.

The driving controller 200 generates the data control signal CONT2 for controlling an operation of the data driver 500 based on the input control signal CONT, and outputs the data control signal CONT2 to the data driver 500. The data control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the gamma control signal CONT3 for controlling an operation of the gamma reference voltage generator 400 based on the input control signal CONT, and outputs the gamma control signal CONT3 to the gamma reference voltage generator 400.

In an embodiment, the gate driver 300 generates gate signals driving the gate lines GL in response to the gate control signal CONT1 received from the driving controller 200. The gate driver 300 outputs the gate signals to the gate lines GL. In an embodiment, for example, the gate driver 300 may sequentially output the gate signals to the gate lines GL. In an embodiment, for example, the gate driver 300 may be mounted on the peripheral region of the display panel 100. In an embodiment, for example, the gate driver 300 may be integrated on the peripheral region of the display panel 100.

In an embodiment, the gamma reference voltage generator 400 generates a gamma reference voltage VGREF in response to the gamma control signal CONT3 received from the driving controller 200. The gamma reference voltage generator 400 provides the gamma reference voltage VGREF to the data driver 500.

In an embodiment, the gamma reference voltage generator 400 may be disposed in the driving controller 200, or in the data driver 500.

In an embodiment, the data driver 500 receives the data control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

Figure 2:
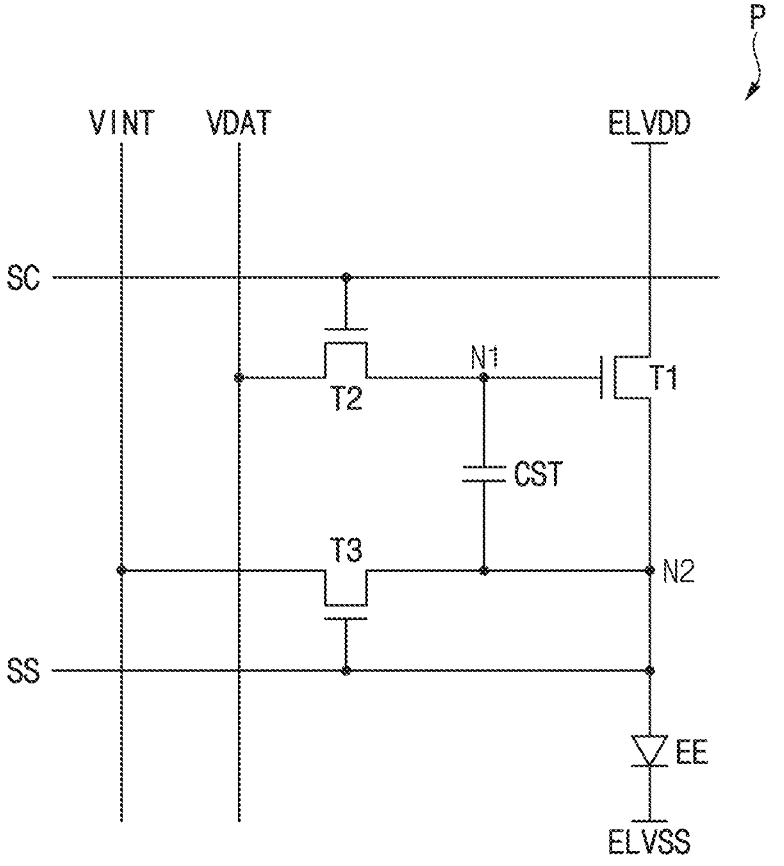
FIG. 2 is a circuit diagram illustrating an example of a pixel of a display panel of FIG. 1.

FIG. 2 is a circuit diagram illustrating an example of the pixel P of the display panel 100 of FIG. 1.

Referring to FIGS. 1 and 2, in an embodiment, the pixel P may receive a scan signal SC, a sensing signal SS, the data voltage VDAT, an initialization voltage VINT, a first power voltage ELVDD and a second power voltage ELVSS. The gate signal may include the scan signal SC and the sensing signal SS.

The first power voltage ELVDD may be higher than the second power voltage ELVSS. The pixel P may include a first transistor T1, a second transistor T3, a third transistor T3, a storage capacitor CST and a light emitting element EE.

The first transistor T1 may include a control electrode connected to a first node N1, include a first electrode that receives the first power voltage ELVDD and a second electrode connected to a second node N2. The first transistor T1 may generate a driving current based on a voltage between the first node N1 and the second node N2. The first transistor T1 may be referred to as a driving transistor.

The second transistor T2 may include a control electrode receiving the scan signal SC, a first electrode that receives the data voltage VDAT and a second electrode connected to the first node N1. The second transistor T2 may provide the data voltage VDAT to the first node N1 in response to the scan signal SC. The second transistor T2 may be referred to as a switching transistor or a writing transistor.

The third transistor T3 may include a control electrode receiving the sensing signal SS, a first electrode that receives the initialization voltage VINT and a second electrode connected to the second node N2. The third transistor T3 may provide the initialization voltage VINT to the second node N2 in response to the sensing signal SS. The third transistor T3 may be referred to as an initialization transistor or a sensing transistor.

Although the first transistor T1, the second transistor T2 and the third transistor T3 are N type transistors (e.g. NMOS transistor) in FIG. 2, the invention may not be limited thereto. In an alternative embodiment, at least one selected from the first transistor T1, the second transistor T2 and the third transistor T3 may be P type transistors (e.g. p-channel metal-oxide-semiconductor (PMOS) transistor).

The storage capacitor CST may include a first electrode connected to the first node N1 and a second electrode connected to the second node N2. The storage capacitor CST may store a voltage between the first node N1 and the second node N2.

Although an embodiment where the pixel P includes three transistors and one capacitor is shown in FIG. 2, the invention may not be limited thereto. In an alternative embodiment, the pixel P may include two transistors or four or more transistors and/or two or more capacitors.

The light emitting element EE may include a first electrode (or an anode) connected to the second node N2 and a second electrode (or a cathode) that receives the second power voltage ELVSS. The light emitting element EE may emit a light based on the driving current provided from the first transistor T1.

In an embodiment, the light emitting element EE may be an organic light emitting diode. In an alternative embodiment, the light emitting element EE may be an inorganic light emitting diode or a quantum dot light emitting diode.

Figure 3:
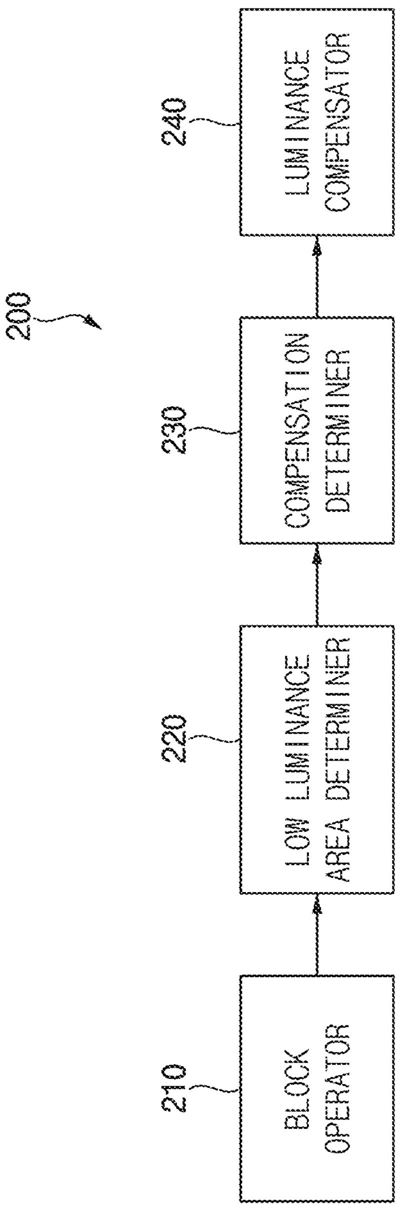
FIG. 3 is a block diagram illustrating an embodiment of a driving controller of FIG. 1.
Figure 4:
FIG. 4 is a diagram illustrating an example of an image displayed on the display panel of FIG. 1.
Figure 7B:
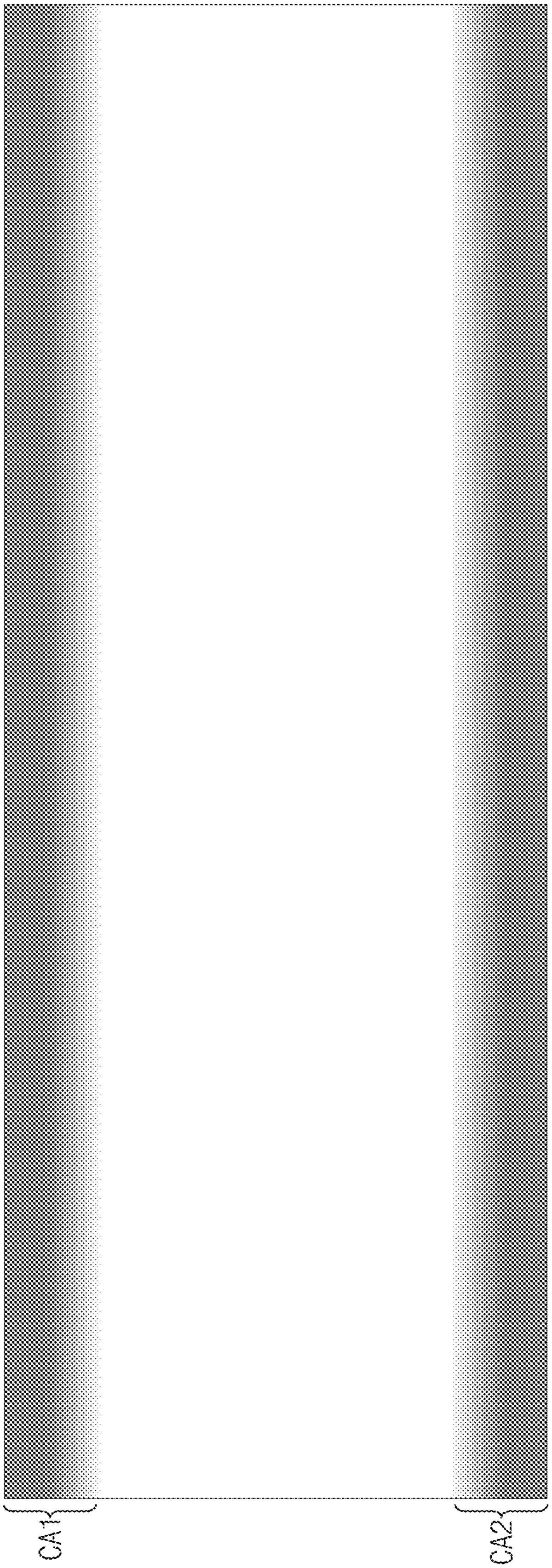
Figure 8A:
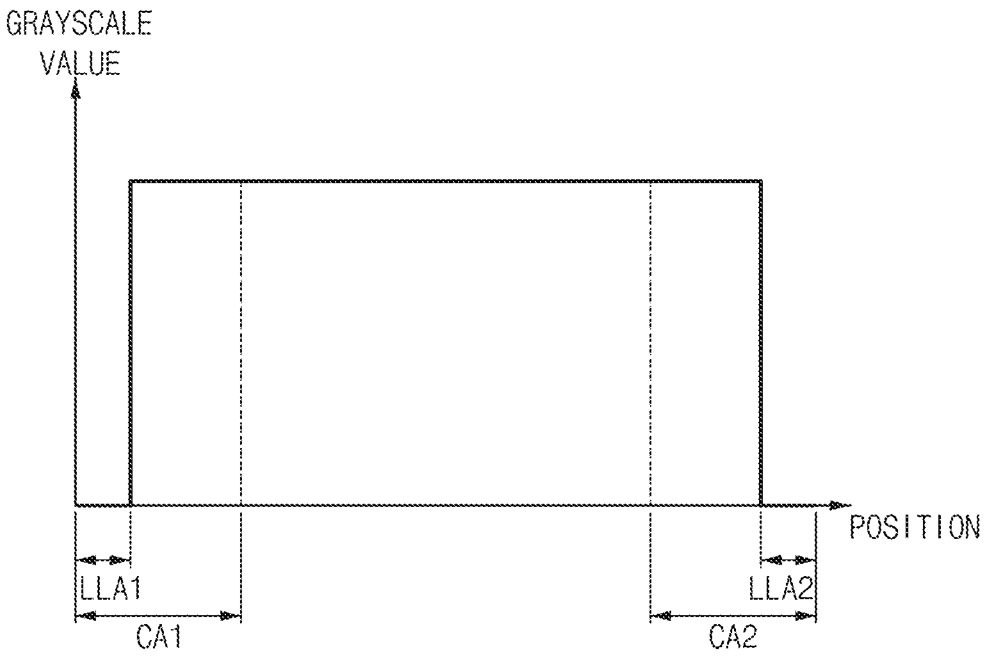
FIG. 8A is a graph illustrating a grayscale value of the image of FIG. 4 according to a position in the image.
Figure 8B:
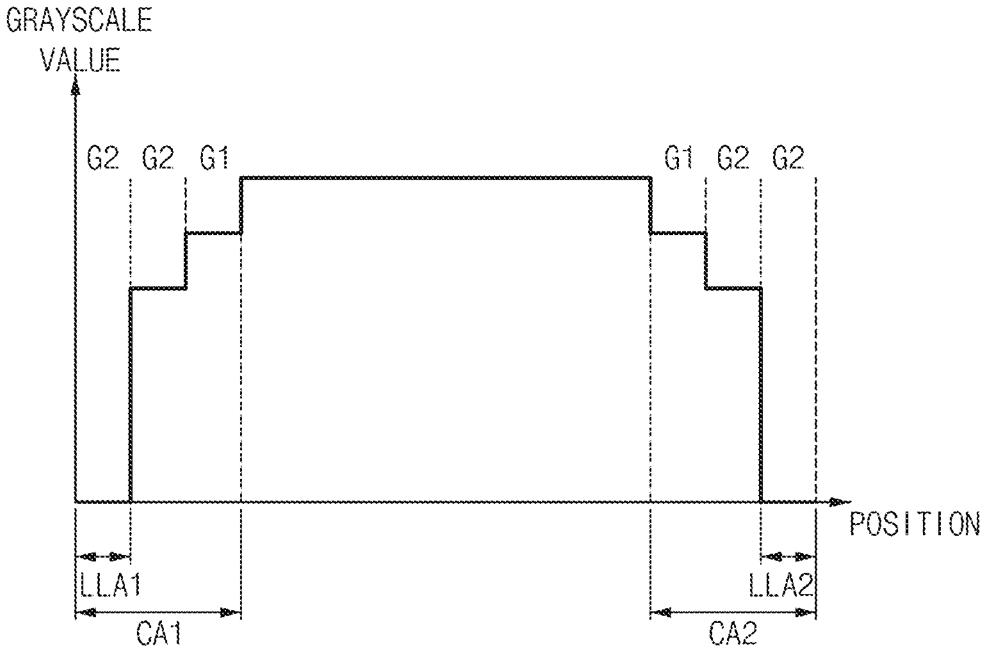
FIG. 8B is a graph illustrating a grayscale value of a compensated image generated by compensating the image of FIG. 4 according to a position in the compensated image.
Figure 9:
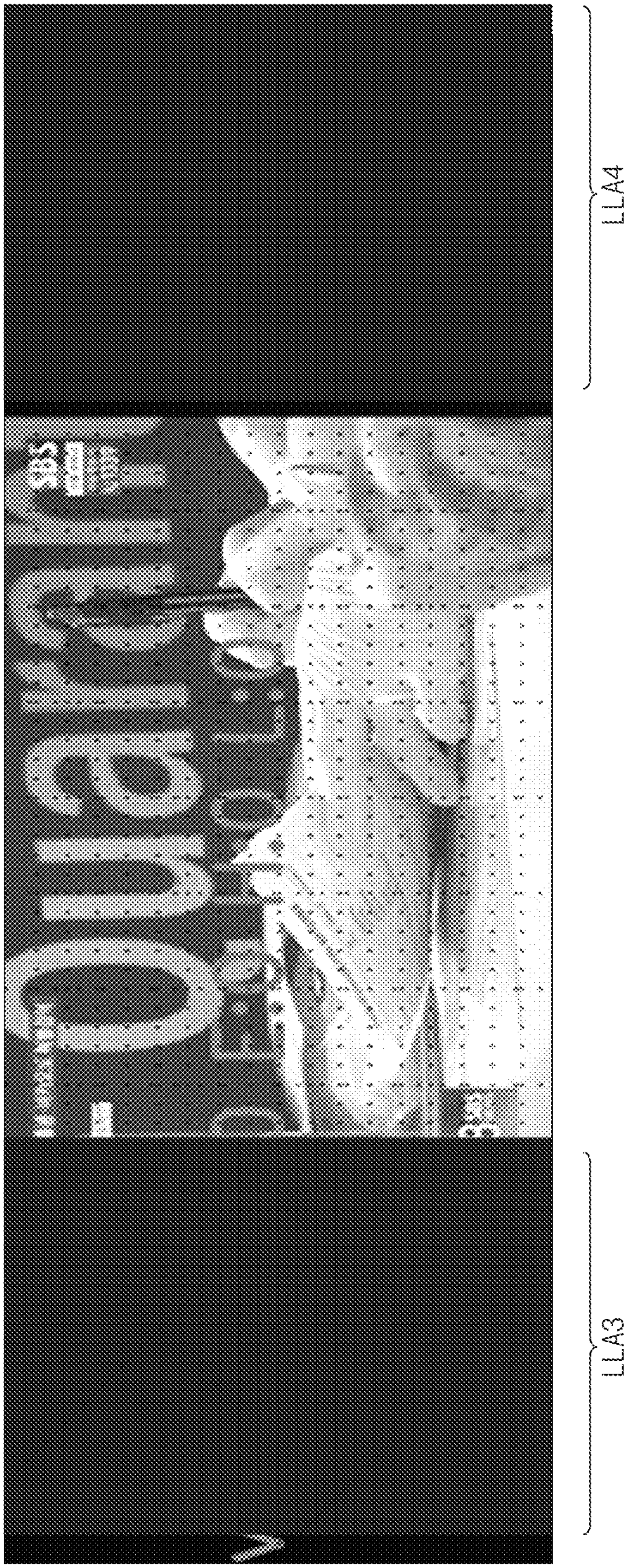
FIG. 9 is a diagram illustrating an example of an image displayed on the display panel of FIG. 1.
Figure 11B:
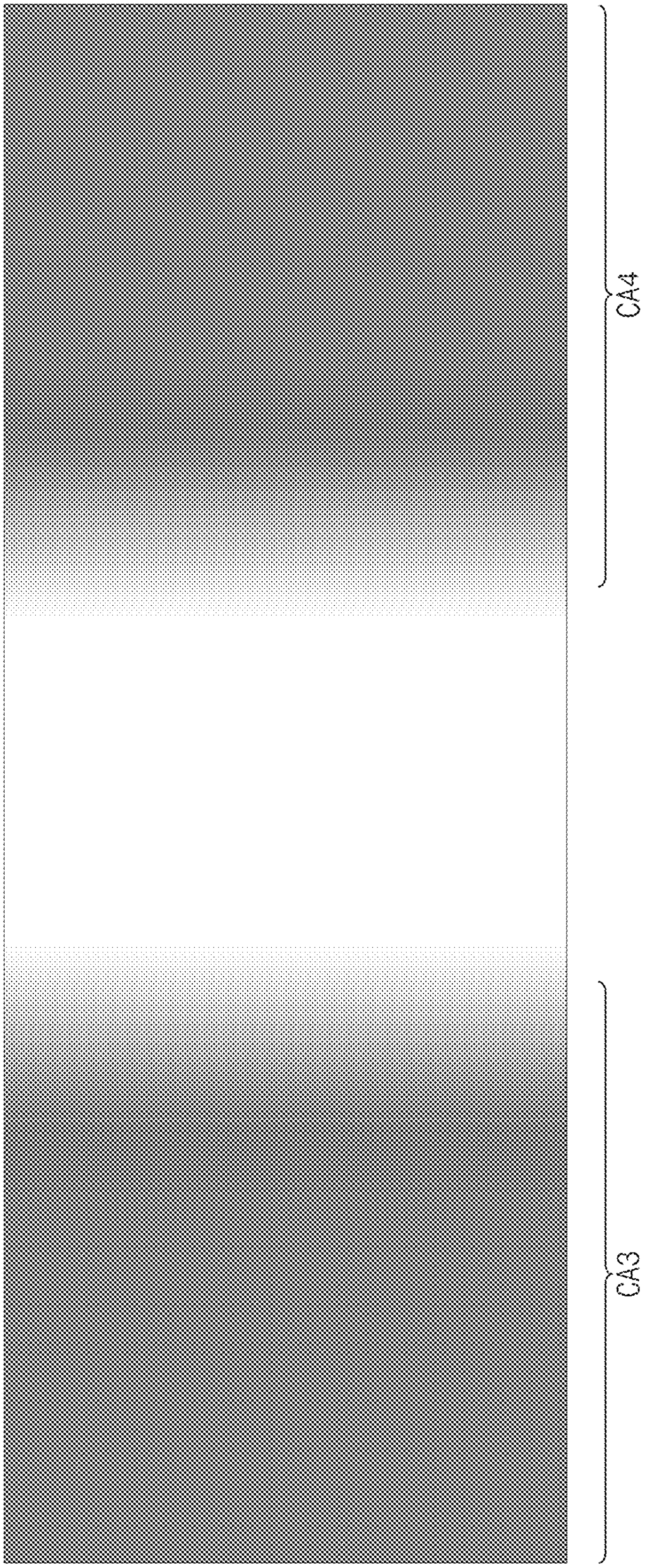
Figure 12A:
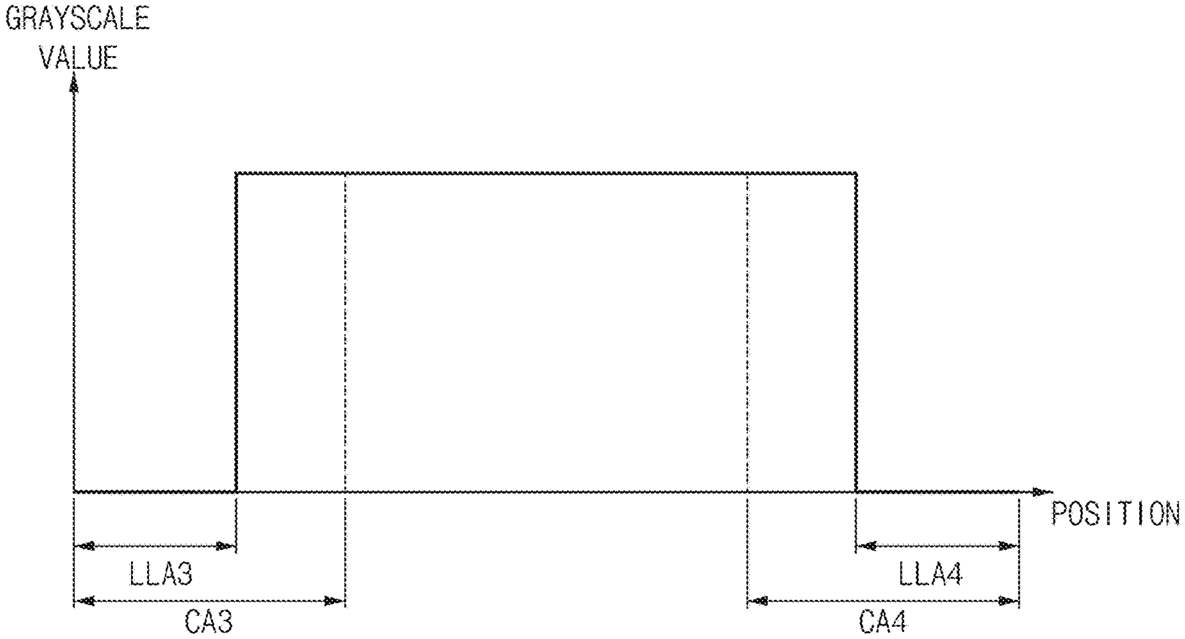
FIG. 12A is a graph illustrating a grayscale value of the image of FIG. 9 according to a position in the image.
Figure 12B:
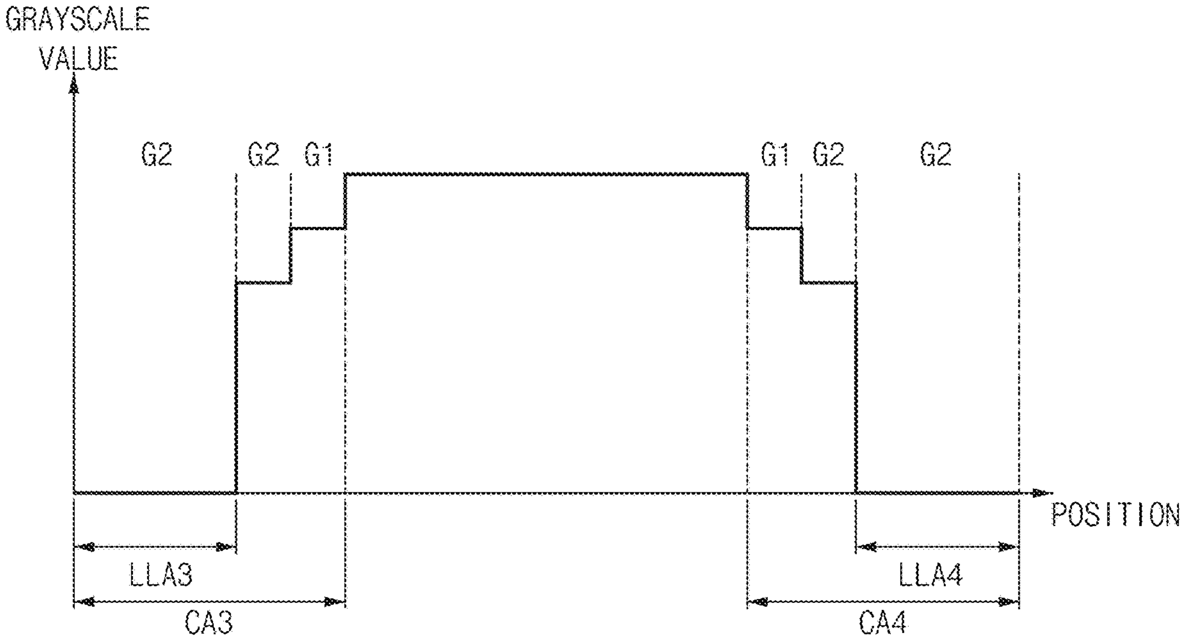
FIG. 12B is a graph illustrating a grayscale value of a compensated image generated by compensating the image of FIG. 9 according to a position in the compensated image.

FIG. 3 is a block diagram illustrating an embodiment of the driving controller 200 of FIG. 1. FIG. 4 is a diagram illustrating an example of an image displayed on the display panel 100 of FIG. 1. FIG. 5 is a diagram illustrating blocks of the display panel 100 of FIG. 1. FIG. 6 is a diagram illustrating block count values of the blocks corresponding to the image of FIG. 4. FIGS. 7A and 7B are diagrams illustrating block compensation values of the blocks corresponding to the image of FIG. 4. FIG. 8A is a graph illustrating a grayscale value of the image of FIG. 4 according to a position in the image. FIG. 8B is a graph illustrating a grayscale value of a compensated image generated by compensating the image of FIG. 4 according to a position in the compensated image. FIG. 9 is a diagram illustrating an example of an image displayed on the display panel 100 of FIG. 1. FIG. 10 is a diagram illustrating block count values of the blocks corresponding to the image of FIG. 9. FIGS. 11A and 11B are diagrams illustrating block compensation values of the blocks corresponding to the image of FIG. 9. FIG. 12A is a graph illustrating a grayscale value of the image of FIG. 9 according to a position in the image. FIG. 12B is a graph illustrating a grayscale value of a compensated image generated by compensating the image of FIG. 9 according to a position in the compensated image.

FIG. 4 represents a first low luminance pattern including low luminance areas (e.g. black areas) disposed on opposing sides of the display panel 100 in a vertical direction, that is, sides opposite to each other in the vertical direction. FIG. 9 represents a second low luminance pattern including low luminance areas (e.g. black areas) disposed on opposing sides of the display panel 100 in a horizontal direction, that is, sides opposite to each other in the horizontal direction.

Referring to FIGS. 1 to 12B, an embodiment of the display panel driver (e.g. the driving controller 200) may determine at least one selected from the first low luminance pattern and the second low luminance pattern, where the first low luminance pattern includes a first low luminance area LLA1 at a first end portion of the display panel 100 in the vertical direction and a second low luminance area LLA2 at a second end portion of the display panel 100 in the vertical direction, and the second low luminance pattern includes a third low luminance area LLA3 at a first end portion of the display panel 100 in the horizontal direction and a fourth low luminance area LLA4 at a second end portion of the display panel 100 in the horizontal direction. Herein, an end portion of the display panel 100 in the vertical direction is an end portion facing or normal to the vertical direction and extending in the horizontal direction, and an end portion of the display panel 100 in the horizontal direction is an end portion facing or normal to the horizontal direction and extending in the vertical direction. That is, an end portion of the display panel 100 in the vertical direction is an end portion among end portions opposite to each other in the vertical direction, and an end portion of the display panel 100 in the horizontal direction is an end portion among end portions opposite to each other in the horizontal direction.

In an embodiment, the display panel driver may determine only the first low luminance pattern including the first low luminance area LLA1 at the first end portion of the display panel 100 in the vertical direction and the second low luminance area LLA2 at the second end portion of the display panel 100 in the vertical direction.

In an embodiment, the display panel driver may determine only the second low luminance pattern including the third low luminance area LLA3 at the first end portion of the display panel 100 in the horizontal direction and the fourth low luminance area LLA4 at the second end portion of the display panel 100 in the horizontal direction.

When the first low luminance pattern is determined, the display panel driver may determine a first compensation area CA1 including a first boundary between the first low luminance area LLA1 and a first normal area and a second compensation area CA2 including a second boundary between the second low luminance area LLA2 and the first normal area and operate a compensation for reducing grayscale values of the first compensation area CA1 and the second compensation area CA2.

Herein, the first normal area may refer to an area excluding the first low luminance area LLA1 and the second low luminance area LLA2 in the display panel 100. The first normal area may be disposed between the first low luminance area LLA1 and the second low luminance area LLA2 in the vertical direction.

When the second low luminance pattern is determined, the display panel driver may determine a third compensation area CA3 including a third boundary between the third low luminance area LLA3 and a second normal area and a fourth compensation area CA4 including a fourth boundary between the fourth low luminance area LLA4 and the second normal area and operate a compensation for reducing grayscale values of the third compensation area CA3 and the fourth compensation area CA4.

Herein, the second normal area may refer to an area excluding the third low luminance area LLA3 and the fourth low luminance area LLA4 in the display panel 100. The second normal area may be disposed between the third low luminance area LLA3 and the fourth low luminance area LLA4 in the horizontal direction.

The display panel driver may divide the input image data IMG into a plurality of blocks corresponding to the display panel 100. The display panel driver may determine whether the block is a low luminance block based on an average grayscale value of the block. The display panel driver may determine whether the low luminance blocks form at least one selected from a low luminance block row or a low luminance block column. When the low luminance block rows are symmetrically disposed at a first end portion of the display panel 100 in the vertical direction and a second end portion of the display panel 100 in the vertical direction, the first low luminance pattern may be determined (or detected). When the low luminance block columns are symmetrically disposed at a first end portion of the display panel 100 in the horizontal direction and a second end portion of the display panel 100 in the horizontal direction, the second low luminance pattern may be determined (or detected). In an embodiment, for example, when the low luminance block rows are symmetrically disposed at the first end portion of the display panel 100 in the vertical direction and the second end portion of the display panel 100 in the vertical direction, the display panel driver (e.g. a compensation determiner 230) may determine (or detect) the first low luminance pattern. When the low luminance block columns are symmetrically disposed at a first end portion of the display panel 100 in the horizontal direction and a second end portion of the display panel 100 in the horizontal direction, the display panel driver (e.g. the compensation determiner 230) may determine (or detect) the second low luminance pattern.

In an embodiment, as shown in FIG. 3, the display panel driver (e.g. the driving controller 200) may include a block operator 210, a low luminance area determiner 220, the compensation determiner 230 and a luminance compensator 240. The block operator 210 may divide the input image data IMG into the plurality of blocks corresponding to the display panel 100 and calculate the average grayscale value of each block. The low luminance area determiner 220 may determine the low luminance area based on the average grayscale value of the block. The compensation determiner 230 may determine at least one selected from the first low luminance pattern and the second low luminance pattern based on the low luminance area. When the first low luminance pattern is determined, the luminance compensator 240 may operate the compensation for reducing the grayscale values of the first compensation area and the second compensation area. When the second low luminance pattern is determined, the luminance compensator 240 may operate the compensation for reducing the grayscale values of the third compensation area and the fourth compensation area.

In an embodiment, the display panel driver may determine at least one selected from the first low luminance pattern and the second low luminance pattern based on whether a grayscale value of a present frame of the input image data IMG is less than a grayscale threshold value.

In an embodiment, for example, the display panel driver may divide the input image data IMG to the plurality of blocks BL1 to BL288 corresponding to the display panel 100, as shown in FIG. 5. When the average grayscale value of a block is less than the grayscale threshold value, the display panel driver may increase a block count value of the block. When the average grayscale value of the block is greater than or equal to the grayscale threshold value, the display panel driver may decrease the block count value of the block. The display panel driver may determine a block having the block count value greater than or equal to a count threshold value as the low luminance block. A reason for comparing the block count value with the count threshold value is to check whether the block continuously displays a low luminance image for more than a certain number of frames.

The display panel 100 may be divided into 288 blocks BL1 to BL288. The blocks BL1 to BL288 may be disposed in a matrix form having eighteen block rows R1 to R18 and sixteen block columns C1 to C16. However, the invention may not be limited to the number of the blocks of the display panel 100 and the arrangements of the blocks.

In an embodiment, the display panel driver may determine at least one selected from the first low luminance pattern and the second low luminance pattern based on whether the grayscale value of the present frame of the input image data IMG is less than the grayscale threshold value and whether an absolute value of a difference between the grayscale value of the present frame and a grayscale value of a previous frame is less than a grayscale difference threshold value.

In an embodiment, for example, when the average value of the present frame of the block is less than the grayscale threshold value and the absolute value of the difference between the average value of the present frame of the block and the average value of the previous frame of the block is less than the grayscale difference threshold value, the display panel driver may increase the block count value of the block. When the average value of the present frame of the block is greater than or equal to the grayscale threshold value or the absolute value of the difference between the average value of the present frame of the block and the average value of the previous frame of the block is greater than or equal to the grayscale difference threshold value, the display panel driver may decrease the block count value of the block. The display panel driver may determine the block having the block count value greater than or equal to the count threshold value as the low luminance block. A reason for comparing the block count value with the count threshold value is to check whether the block continuously displays a low luminance image for more than a certain number of frames. In an embodiment, the absolute value of the difference between the average value of the present frame and the average value of the previous frame is compared to the grayscale difference threshold value so that the block count value may be increased only when the absolute value of the difference between the average value of the present frame and the average value of the previous frame is little. Thus, an accuracy of the determination of the low luminance block may be enhanced. In addition, when the grayscale difference threshold value is used instead of the grayscale threshold value, a number of data bits may be reduced so that a computational load and a size of a memory may be reduced.

When an image including black images disposed at opposing end portions in the vertical direction of the display panel 100 is continuously displayed on the display panel 100 as shown in FIG. 4, a block count value of each blocks in a first block row (e.g. R1) and a block count value of each blocks in a last block row (e.g. R18) may continuously increase and converge to a maximum value of 29 as shown in FIG. 6. In contrast, block count values of each block in block rows (e.g. R2 to R17) displaying normal images having varied grayscale values from frame to frame may be zero.

In an embodiment, for example, the block count value may be set not to be greater than the maximum value (e.g. 29) and not to be less than a minimum value (e.g. zero).

When a number of the low luminance blocks in the block row is greater than or equal to a first number threshold value, the display panel driver may determine the block row as a low luminance block row. In an embodiment, as shown in FIG. 6, the number of the low luminance blocks in the block row may be sixteen and in such an embodiment, the first number threshold value may be fourteen.

In an embodiment, for example, all of the blocks in the first block row (e.g. R1) and all of the blocks in the last block row (e.g. R18) are the low luminance blocks so that the first block row (e.g. R1) and the last block row (e.g. R18) may be determined as the low luminance block rows.

When the low luminance block rows are symmetrically disposed at the first end portion of the display panel 100 in the vertical direction and the second end portion of the display panel 100 in the vertical direction, that is, at the first end portion and the second end portion of the display panel 100 opposite to each other in the vertical direction, the display panel driver may determine the first low luminance pattern.

In an embodiment, for example, one low luminance block row (e.g. R1) is disposed at the first end portion in the vertical direction and one low luminance block row (e.g. R18) is disposed at the second end portion in the vertical direction so that the number (e.g. one) of the low luminance block rows at the first end portion in the vertical direction and the number (e.g. one) of the low luminance block rows at the second end portion in the vertical direction are the same as (symmetrical with) each other and thus, the image of FIG. 4 may be determined as the first low luminance pattern.

In an embodiment, for example, the first compensation area CA1 may include the first boundary and the second compensation area CA2 may include the second boundary.

In an embodiment, for example, a size of the first compensation area CA1 may be greater than a size of the first low luminance area LLA1. In an embodiment, for example, a size of the second compensation area CA2 may be greater than a size of the second low luminance area LLA2. The first low luminance area LLA1 may start from a first end of the display panel 100 in the vertical direction and end at the first boundary. The first compensation area CA1 may start from the first end of the display panel 100 in the vertical direction and end after passing the first boundary. The second low luminance area LLA2 may start from a second end of the display panel 100 in the vertical direction and end at the second boundary. The second compensation area CA2 may start from the second end of the display panel 100 in the vertical direction and end after passing the second boundary.

In an embodiment, for example, the size of the first low luminance area LLA1 may correspond to one block row in FIG. 6 and the size of the first compensation area CAL may correspond to three block rows in FIG. 7A. In such an embodiment, for example, the size of the second low luminance area LLA2 may correspond to one block row in FIG. 6 and the size of the second compensation area CA2 may correspond to three block rows in FIG. 7A.

In an embodiment, a compensation degree in the first compensation area CA1 may gradually decrease as being away from the first boundary to the first normal area and gradually decrease as being away from the second boundary to the first normal area.

In an embodiment, for example, the compensation degree may be a gain multiplied by the grayscale value of the input image data IMG. When the gain is one, it means that the grayscale value of the input image data IMG is not compensated. As the gain decreases, the compensation degree may increase.

In an embodiment, as shown in FIG. 7A, a second gain G2 may be applied to the first boundary (the first block row R1 and a second block row R2) and a first gain G1 may be applied to a third block row R3 shifted from the first boundary (the first block row R1 and the second block row R2) toward the first normal area. The first gain G1 may be greater than the second gain G2. The compensation degree of the third block row R3 may be less than the compensation degrees of the first block row R1 and the second block row R2.

In such an embodiment, the second gain G2 may be applied to the second boundary (a seventeenth block row R17 and an eighteenth block row R18) and the first gain G1 may be applied to a sixteenth block row R16 shifted from the second boundary (the seventeenth block row R17 and the eighteenth block row R18) toward the first normal area. The compensation degree of the sixteenth block row R16 may be less than the compensation degrees of the seventeenth block row R17 and the eighteenth block row R18.

FIG. 7B expresses FIG. 7A through shading. The white portion of FIG. 7B is an area where the gain is one, and as a shade becomes darker, the gain decreases and the compensation degree increases.

A position in FIGS. 8A and 8B represents a position in the display panel 100 in the vertical direction. FIG. 8A represents a case in which the black images are displayed at opposing end portions in the vertical direction of the display panel 100 as shown in FIG. 4.

In FIG. 8B, the first normal area is not compensated so that a grayscale value of an input image in the first normal area is the same as a grayscale value of a compensation image in the first normal area. The first low luminance area LLA1 may be compensated using the second gain G2. However, the grayscale value of the input image of the first low luminance area LLA1 is zero in FIG. 8B so that the grayscale value of the compensation image of the first low luminance area LLA1 may also be zero. A portion of the first compensation area CA1 immediately adjacent to the first low luminance area LLA1 may be compensated using the second gain G2 and a portion of the first compensation area CA1 spaced apart from the first low luminance area LLA1 may be compensated using the first gain G1 greater than the second gain G2.

Similarly, the second low luminance area LLA2 may be compensated using the second gain G2. However, the grayscale value of the input image of the second low luminance area LLA2 is zero in FIG. 8B so that the grayscale value of the compensation image of the second low luminance area LLA2 may also be zero. A portion of the second compensation area CA2 immediately adjacent to the second low luminance area LLA2 may be compensated using the second gain G2 and a portion of the second compensation area CA2 spaced apart from the second low luminance area LLA2 may be compensated using the first gain G1 greater than the second gain G2.

When an image including black images disposed at opposing end portions in the horizontal direction of the display panel 100 is continuously displayed on the display panel 100 as shown in FIG. 9, block count values of each block in first four block columns (e.g. C1, C2, C3 and C4) and block count values of each block in last four block columns (e.g. C13, C14, C15 and C16) may continuously increase and converge to a maximum value of 29 as shown in FIG. 10. In contrast, block count values of each block in block columns (e.g. C5 to C12) displaying normal images having varied grayscale values from frame to frame may be zero.

When a number of the low luminance blocks in the block column is greater than or equal to a second number threshold value, the display panel driver may determine the block column as a low luminance block column. In an embodiment, as shown in FIG. 10, the number of the low luminance blocks in the block column may be eighteen and in such an embodiment, the second number threshold value may be sixteen.

In an embodiment, for example, all of the blocks in the first four block columns (e.g. C1, C2, C3 and C4) and all of the blocks in the last four block columns (e.g. C13, C14, C15 and C16) are the low luminance blocks so that the first four block columns (e.g. C1, C2, C3 and C4) and the last four block columns (e.g. C13, C14, C15 and C16) may be determined as the low luminance block columns.

When the low luminance block columns are symmetrically disposed at the first end portion of the display panel 100 in the horizontal direction and the second end portion of the display panel 100 in the horizontal direction, that is, at the first end portion and the second end portion of the display panel 100 opposite to each other in the horizontal direction, the display panel driver may determine the second low luminance pattern.

In an embodiment, for example, four low luminance block columns (e.g. C1, C2, C3 and C4) are disposed at the first end portion in the horizontal direction and four low luminance block columns (e.g. C13, C14, C15 and C16) are disposed at the second end portion in the horizontal direction so that the number (e.g. four) of the low luminance block columns at the first end portion in the horizontal direction and the number (e.g. four) of the low luminance block columns at the second end portion in the horizontal direction are the same as (symmetrical with) each other and thus, the image of FIG. 9 may be determined as the second low luminance pattern.

In an embodiment, for example, the third compensation area CA3 may include the third boundary and the fourth compensation area CA4 may include the fourth boundary.

In an embodiment, for example, a size of the third compensation area CA3 may be greater than a size of the third low luminance area LLA3. In an embodiment, for example, a size of the fourth compensation area CA4 may be greater than a size of the fourth low luminance area LLA4. The third low luminance area LLA3 may start from a first end of the display panel 100 in the horizontal direction and end at the first boundary. The third compensation area CA3 may start from the first end of the display panel 100 in the horizontal direction and end after passing the third boundary. The fourth low luminance area LLA4 may start from a second end of the display panel 100 in the horizontal direction and end at the fourth boundary. The fourth compensation area CA4 may start from the second end of the display panel 100 in the horizontal direction and end after passing the fourth boundary.

In an embodiment, for example, the size of the third low luminance area LLA3 may correspond to four block columns in FIG. 10 and the size of the third compensation area CA3 may correspond to six block columns in FIG. 11A. In such an embodiment, for example, the size of the fourth low luminance area LLA4 may correspond to four block columns in FIG. 10 and the size of the fourth compensation area CA4 may correspond to six block columns in FIG. 11A.

In an embodiment, a compensation degree in the third compensation area CA3 may gradually decrease as being away from the third boundary to the second normal area and gradually decrease as being away from the fourth boundary to the second normal area.

In an embodiment, for example, the compensation degree may be a gain multiplied by the grayscale value of the input image data IMG. When the gain is one, it means that the grayscale value of the input image data IMG is not compensated. As the gain decreases, the compensation degree may increase.

As shown in FIG. 11A, a second gain G2 may be applied to the third boundary (the fourth block column C4 and a fifth block column C5) and a first gain G1 may be applied to a sixth block column C6 shifted from the third boundary (the fourth block column C4 and a fifth block column C5) toward the second normal area. The first gain G1 may be greater than the second gain G2. The compensation degree of the sixth block column C6 may be less than the compensation degrees of the fourth block column C4 and the fifth block column C5.

Similarly, the second gain G2 may be applied to the fourth boundary (a twelfth block column C12 and a thirteenth block column C13) and the first gain G1 may be applied to an eleventh block column C11 shifted from the fourth boundary (the twelfth block column C12 and the thirteenth block column C13) toward the second normal area. The compensation degree of the eleventh block column C11 may be less than the compensation degrees of the twelfth block column C12 and the thirteenth block column C13.

FIG. 11B expresses FIG. 11A through shading. The white portion of FIG. 11B is an area where the gain is one, and as a shade becomes darker, the gain decreases and the compensation degree increases.

A position in FIGS. 12A and 12B represents a position in the display panel 100 in the horizontal direction. FIG. 12A represents a case in which the black images are displayed at opposing end portions in the horizontal direction of the display panel 100 as shown in FIG. 9.

In FIG. 12B, the second normal area is not compensated so that a grayscale value of an input image in the second normal area is the same as a grayscale value of a compensation image in the second normal area. The third low luminance area LLA3 may be compensated using the second gain G2. However, the grayscale value of the input image of the third low luminance area LLA3 is zero in FIG. 12B so that the grayscale value of the compensation image of the third low luminance area LLA3 may also be zero. A portion of the third compensation area CA3 right adjacent to the third low luminance area LLA3 may be compensated using the second gain G2 and a portion of the third compensation area CA3 spaced apart from the third low luminance area LLA3 may be compensated using the first gain G1 greater than the second gain G2.

Similarly, the fourth low luminance area LLA4 may be compensated using the second gain G2. However, the grayscale value of the input image of the fourth low luminance area LLA4 is zero in FIG. 12B so that the grayscale value of the compensation image of the fourth low luminance area LLA4 may also be zero. A portion of the fourth compensation area CA4 right adjacent to the fourth low luminance area LLA4 may be compensated using the second gain G2 and a portion of the fourth compensation area CA4 spaced apart from the fourth low luminance area LLA4 may be compensated using the first gain G1 greater than the second gain G2.

According to an embodiment of the embodiment, the display panel driver may determine the low luminance pattern including the low luminance areas LLA1 and LLA2 or LLA3 and LLA4 disposed on opposing sides of the display panel 100 in the vertical direction or in the horizontal direction. When the display panel driver determines the low luminance pattern, the display panel driver may determine an area including the boundary between the low luminance area LLA1 and LLA2 or LLA3 and LLA4 and the normal area as the compensation area CAL and CA2 or CA3 and CA4 and may operate (or perform) a compensation for reducing the grayscale value of the compensation area CAL and CA2 or CA3 and CA4.

When the low luminance areas LLA1 and LLA2 or LLA3 and LLA4 are disposed on opposing sides of the display panel 100 in the vertical direction or in the horizontal direction, the luminance of the boundary between the low luminance area LLA1 and LLA2 or LLA3 and LLA4 and the normal area may be reduced so that the afterimage that may occur at the boundary between the low luminance area LLA1 and LLA2 or LLA3 and LLA4 and the normal area may be reduced. Thus, the display quality of the display panel 100 may be enhanced.

Figure 13:
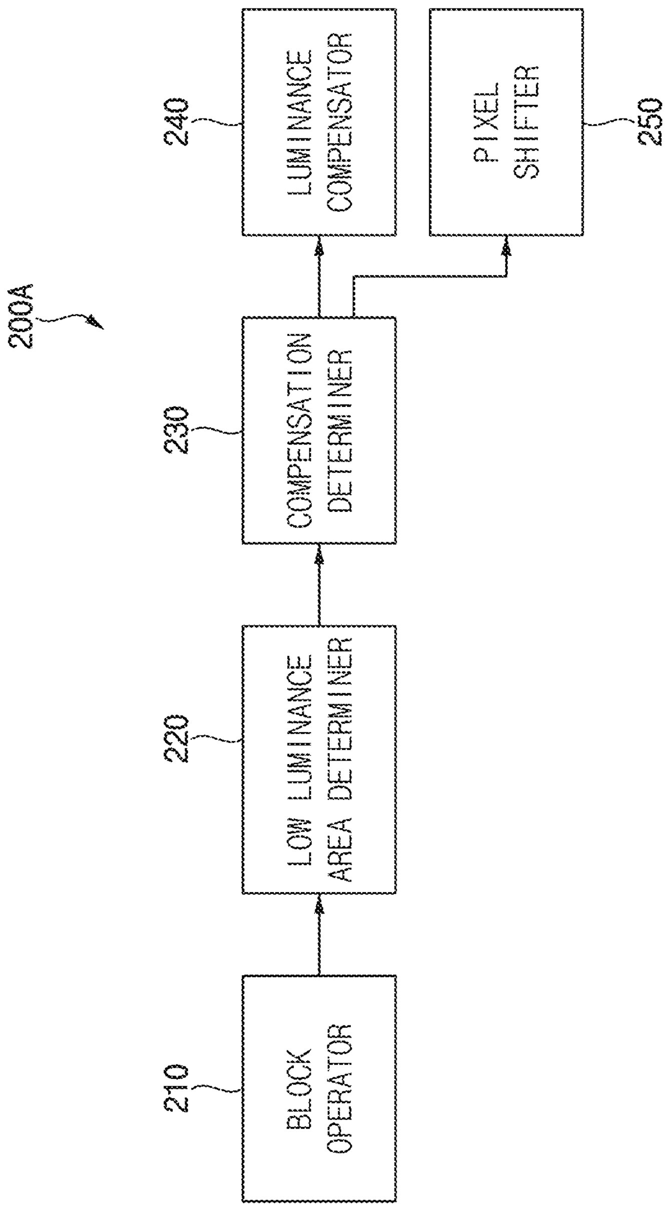
FIG. 13 is a block diagram illustrating a driving controller of a display apparatus according to an embodiment of the invention.
Figure 14A:
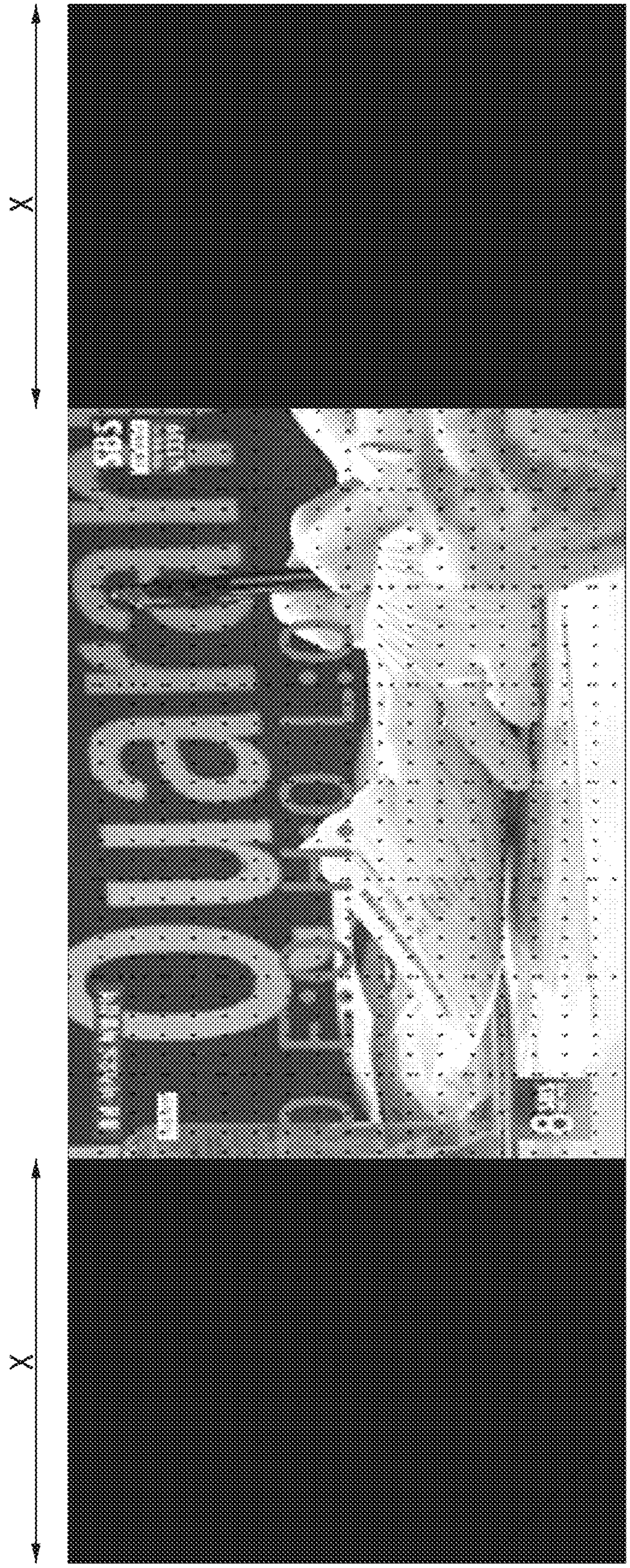
FIGS. 14A to 14C are diagrams illustrating an operation of a pixel shifter of FIG. 13.
Figure 14B:
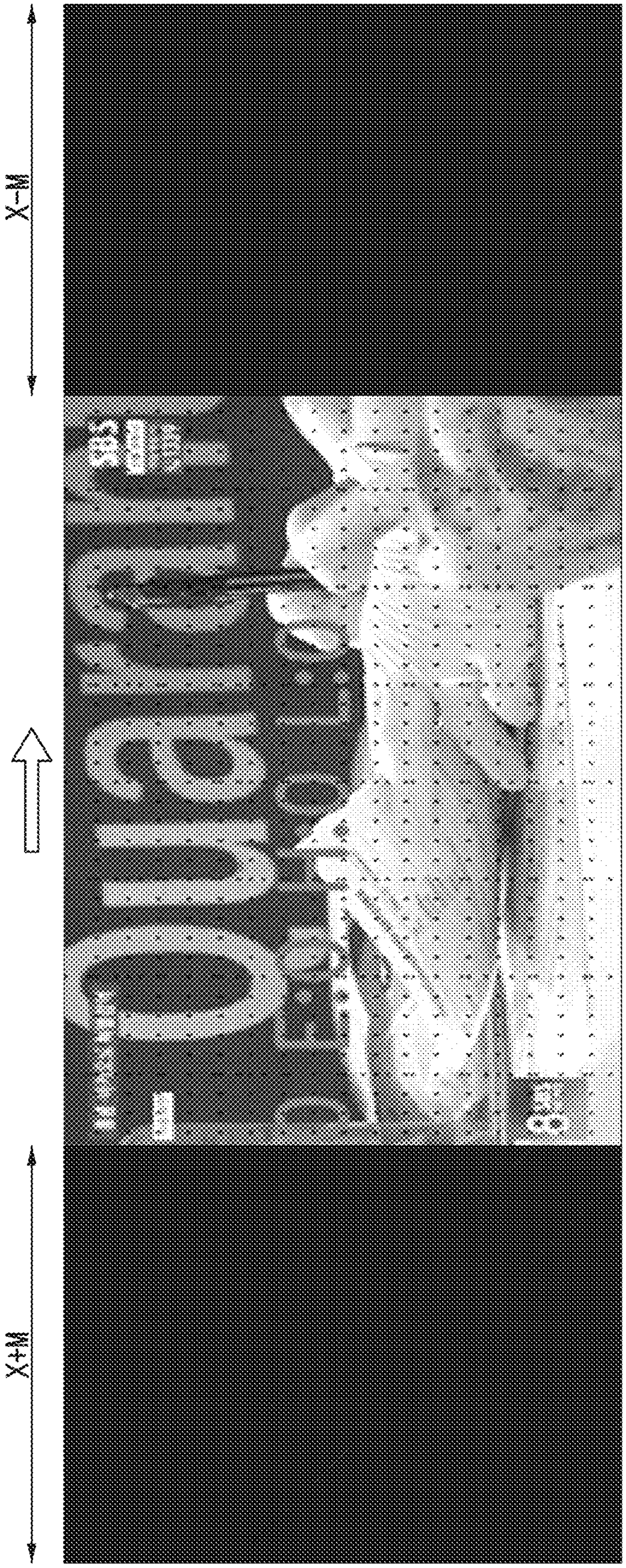
Figure 14C:
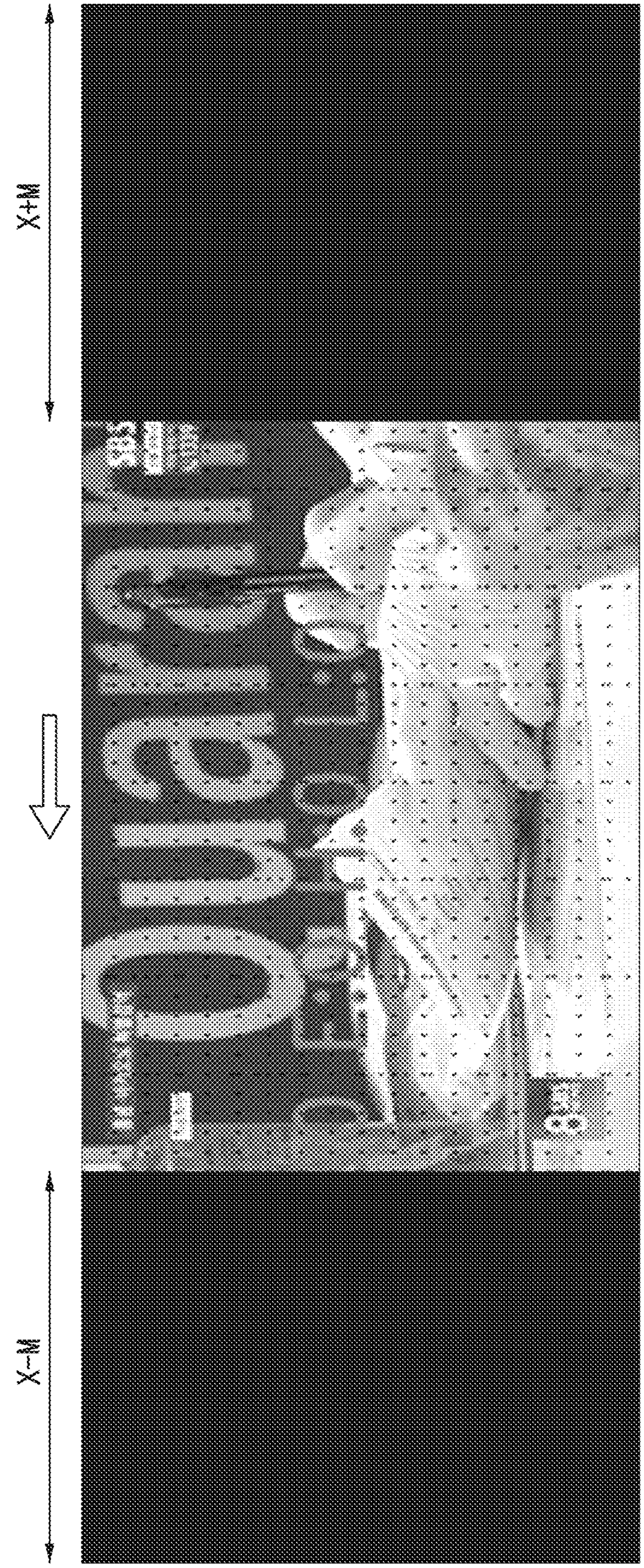

FIG. 13 is a block diagram illustrating a driving controller 200A of a display apparatus according to an embodiment of the invention. FIGS. 14A to 14C are diagrams illustrating an operation of a pixel shifter 250 of FIG. 13.

An embodiment of the display apparatus including the driving controller of FIG. 13 is substantially the same as embodiments of the display apparatus described above referring to FIGS. 1 to 12 except that the driving controller further includes a pixel shifter. Thus, the same reference numerals will be used to refer to the same or like elements as those described above with reference to FIGS. 1 to 12 and any repetitive detailed description thereof will be omitted or simplified.

Referring to FIGS. 1, 2 and 4 to 13, an embodiment of the display apparatus includes a display panel 100 and a display panel driver. The display panel driver drives the display panel 100. The display panel driver includes a driving controller 200A, a gate driver 300, a gamma reference voltage generator 400 and a data driver 500.

The display panel driver (e.g. the driving controller 200A) may determine at least one selected from the first low luminance pattern including a first low luminance area LLA1 at a first end portion of the display panel 100 in the vertical direction and a second low luminance area LLA2 at a second end portion of the display panel 100 in the vertical direction and the second low luminance pattern including a third low luminance area LLA3 at a first end portion of the display panel 100 in the horizontal direction and a fourth low luminance area LLA4 at a second end portion of the display panel 100 in the horizontal direction.

When the first low luminance pattern is determined, the display panel driver may determine a first compensation area CAL including a first boundary between the first low luminance area LLA1 and a first normal area and a second compensation area CA2 including a second boundary between the second low luminance area LLA2 and the first normal area and operate a compensation for reducing grayscale values of the first compensation area CA1 and the second compensation area CA2.

When the second low luminance pattern is determined, the display panel driver may determine a third compensation area CA3 including a third boundary between the third low luminance area LLA3 and a second normal area and a fourth compensation area CA4 including a fourth boundary between the fourth low luminance area LLA4 and the second normal area and operate a compensation for reducing grayscale values of the third compensation area CA3 and the fourth compensation area CA4.

In an embodiment, as shown in FIG. 13, the display panel driver (e.g. the driving controller 200A) may include a block operator 210, a low luminance area determiner 220, a compensation determiner 230 and a luminance compensator 240. The block operator 210 may divide the input image data IMG into the plurality of blocks corresponding to the display panel 100 and calculate the average grayscale value of the block. The low luminance area determiner 220 may determine the low luminance area based on the average grayscale value of each block. The compensation determiner 230 may determine at least one selected from the first low luminance pattern and the second low luminance pattern based on the low luminance area. When the first low luminance pattern is determined, the luminance compensator 240 may operate the compensation for reducing the grayscale values of the first compensation area and the second compensation area. When the second low luminance pattern is determined, the luminance compensator 240 may operate the compensation for reducing the grayscale values of the third compensation area and the fourth compensation area.

The display panel driver (e.g. the driving controller 200A) may further include a pixel shifter 250. When the second low luminance pattern is determined, the pixel shifter 250 may periodically shift a display image in the horizontal direction of the display panel 100.

Referring to FIGS. 14A to 14C, in an embodiment, the pixel shifter 250 may periodically shift the display image in the horizontal direction of the display panel 100.

FIG. 14A represents a case where the display image is disposed in a center. In FIG. 14A, a black box at a first end portion in the horizontal direction may have a width of X pixel widths and a black box at a second end portion in the horizontal direction may have a width of X pixel widths.

FIG. 14B represents a case where the display image is maximally shifted to the second end portion in the horizontal direction. In FIG. 14B, the black box at the first end portion in the horizontal direction may have a width of X+M pixel widths and the black box at the second end portion in the horizontal direction may have a width of X−M pixel widths.

FIG. 14C represents a case where the display image is maximally shifted to the first end portion in the horizontal direction. In FIG. 14C, the black box at the first end portion in the horizontal direction may have a width of X−M pixel widths and the black box at the second end portion in the horizontal direction may have a width of X+M pixel widths.

Similarly, when the first low luminance pattern is determined, the pixel shifter 250 may periodically shift the display image in the vertical direction of the display panel 100.

According to an embodiment, the display panel driver may determine the low luminance pattern including the low luminance areas LLA1 and LLA2 or LLA3 and LLA4 disposed on opposing sides of the display panel 100 in the vertical direction or in the horizontal direction. When the display panel driver determines the low luminance pattern, the display panel driver may determine an area including the boundary between the low luminance area LLA1 and LLA2 or LLA3 and LLA4 and the normal area as the compensation area CAL and CA2 or CA3 and CA4 and may operate a compensation for reducing the grayscale value of the compensation area CAL and CA2 or CA3 and CA4.

When the low luminance areas LLA1 and LLA2 or LLA3 and LLA4 are disposed on opposing sides of the display panel 100 in the vertical direction or in the horizontal direction, the luminance of the boundary between the low luminance area LLA1 and LLA2 or LLA3 and LLA4 and the normal area may be reduced so that the afterimage that may occur at the boundary between the low luminance area LLA1 and LLA2 or LLA3 and LLA4 and the normal area may be reduced. Thus, the display quality of the display panel 100 may be enhanced.

In an embodiment, when the second low luminance pattern is determined, the display panel driver may operate the compensation for reducing the grayscale values of the third compensation area CA3 including the third boundary and the fourth compensation area CA4 including the fourth boundary and operate the pixel shift for periodically shifting the display image in the horizontal direction of the display panel 100 so that the afterimage that may occur at the third boundary and the fourth boundary may be further reduced.

Figure 15:
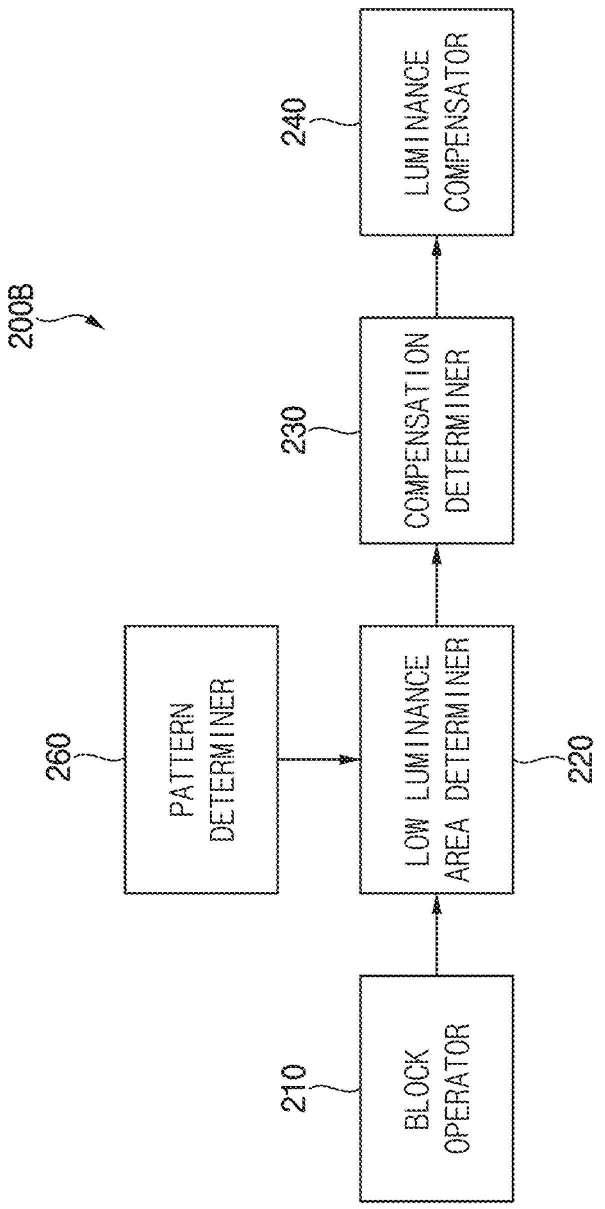
FIG. 15 is a block diagram illustrating a driving controller of a display apparatus according to an embodiment of the invention.

FIG. 15 is a block diagram illustrating a driving controller 200B of a display apparatus according to an embodiment of the invention.

An embodiment of the display apparatus including the driving controller of FIG. 15 is substantially the same as embodiments of the display apparatus described above referring to FIGS. 1 to 12 except that the driving controller further includes a pattern determiner. Thus, the same reference numerals will be used to refer to the same or like elements as those described above with reference to FIGS. 1 to 12 and any repetitive detailed description thereof will be omitted or simplified.

Referring to FIGS. 1, 2, 4 to 12 and 15, an embodiment of the display apparatus includes a display panel 100 and a display panel driver. The display panel driver drives the display panel 100. The display panel driver includes a driving controller 200B, a gate driver 300, a gamma reference voltage generator 400 and a data driver 500.

The display panel driver (e.g. the driving controller 200B) may determine at least one selected from the first low luminance pattern including a first low luminance area LLA1 at a first end portion of the display panel 100 in the vertical direction and a second low luminance area LLA2 at a second end portion of the display panel 100 in the vertical direction and the second low luminance pattern including a third low luminance area LLA3 at a first end portion of the display panel 100 in the horizontal direction and a fourth low luminance area LLA4 at a second end portion of the display panel 100 in the horizontal direction.

When the first low luminance pattern is determined, the display panel driver may determine a first compensation area CA1 including a first boundary between the first low luminance area LLA1 and a first normal area and a second compensation area CA2 including a second boundary between the second low luminance area LLA2 and the first normal area and operate a compensation for reducing grayscale values of the first compensation area CA1 and the second compensation area CA2.

When the second low luminance pattern is determined, the display panel driver may determine a third compensation area CA3 including a third boundary between the third low luminance area LLA3 and a second normal area and a fourth compensation area CA4 including a fourth boundary between the fourth low luminance area LLA4 and the second normal area and operate a compensation for reducing grayscale values of the third compensation area CA3 and the fourth compensation area CA4.

In an embodiment, as shown in FIG. 15, the display panel driver (e.g. the driving controller 200B) may include a block operator 210, a pattern determiner 260, a low luminance area determiner 220, a compensation determiner 230 and a luminance compensator 240. The block operator 210 may divide the input image data IMG into the plurality of blocks corresponding to the display panel 100 and calculate the average grayscale value of the block. The pattern determiner 260 may determine whether the input image data IMG represent a predetermined exceptional pattern. The low luminance area determiner 220 may determine the low luminance area based on the average grayscale value of each block and whether the input image data IMG represent the predetermined exceptional pattern. The compensation determiner 230 may determine at least one selected from the first low luminance pattern and the second low luminance pattern based on the low luminance area. When the first low luminance pattern is determined, the luminance compensator 240 may operate the compensation for reducing the grayscale values of the first compensation area and the second compensation area. When the second low luminance pattern is determined, the luminance compensator 240 may operate the compensation for reducing the grayscale values of the third compensation area and the fourth compensation area.

In an embodiment, the display panel driver may determine at least one selected from the first low luminance pattern and the second low luminance pattern based on whether a grayscale value of a present frame of the input image data IMG is less than a grayscale threshold value and whether an image of the present frame of the input image data IMG is not the predetermined exceptional pattern.

In an embodiment, for example, the exceptional pattern may be a test pattern for testing the display panel 100. In an embodiment, for example, the test pattern may be a single color pattern, a mixed color pattern, a rectangular pattern, a horizontal stripe pattern, or a vertical stripe pattern, for example. When the display panel 100 displays the test pattern, the compensation of the image may not be desired even if there are low luminance areas at opposing end portions in the vertical direction or at opposing end portions in the horizontal direction.

Thus, in an embodiment of the invention, only when the image of the present frame does not represent the exceptional pattern, the low luminance area determiner 220 may normally operate.

In the exceptional patterns, a grayscale histogram tends to be concentrated on specific grayscale values. In contrast, in a normal pattern which is not the exceptional patterns, the grayscale histogram may be relatively uniformly distributed.

When a uniformity of the grayscale histogram of the present frame of the input image data is less than a uniformity threshold value, the display panel driver may determine the image of the present frame as the exceptional pattern.

In an embodiment, the display panel driver may determine at least one selected from the first low luminance pattern and the second low luminance pattern based on whether the grayscale value of the present frame of the input image data IMG is less than the grayscale threshold value, whether an absolute value of a difference between the grayscale value of the present frame and a grayscale value of a previous frame is less than a grayscale difference threshold value and whether the image of the present frame of the input image data IMG is not the predetermined exceptional pattern. In such an embodiment, the absolute value of the difference between the average value of the present frame and the average value of the previous frame is compared to the grayscale difference threshold value so that the block count value may be increased only when the absolute value of the difference between the average value of the present frame and the average value of the previous frame is little. Thus, an accuracy of the determination of the low luminance block may be enhanced. In addition, when the grayscale difference threshold value is used instead of the grayscale threshold value, a number of data bits may be reduced so that a computational load and a size of a memory may be reduced.

According to an embodiment, the display panel driver may determine the low luminance pattern including the low luminance areas LLA1 and LLA2 or LLA3 and LLA4 disposed on opposing sides of the display panel 100 in the vertical direction or in the horizontal direction. When the display panel driver determines the low luminance pattern, the display panel driver may determine an area including the boundary between the low luminance area LLA1 and LLA2 or LLA3 and LLA4 and the normal area as the compensation area CAL and CA2 or CA3 and CA4 and may operate a compensation for reducing the grayscale value of the compensation area CA1 and CA2 or CA3 and CA4.

When the low luminance areas LLA1 and LLA2 or LLA3 and LLA4 are disposed on opposing sides of the display panel 100 in the vertical direction or in the horizontal direction, the luminance of the boundary between the low luminance area LLA1 and LLA2 or LLA3 and LLA4 and the normal area may be reduced so that the afterimage occurred at the boundary between the low luminance area LLA1 and LLA2 or LLA3 and LLA4 and the normal area may be reduced. Thus, the display quality of the display panel 100 may be enhanced.

Figure 16:
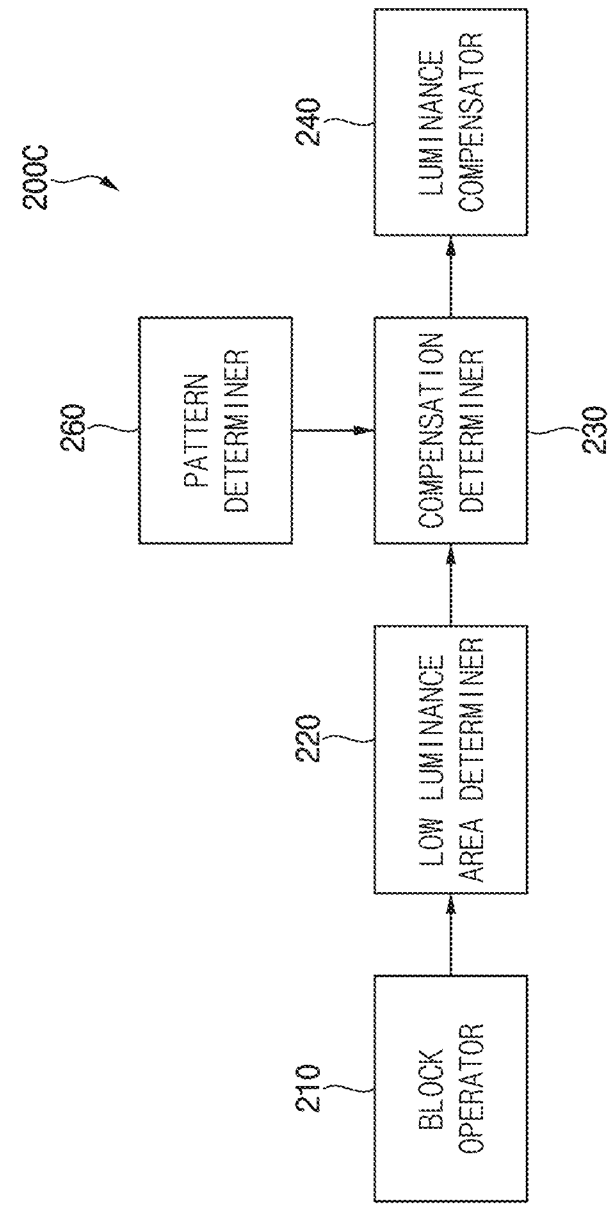
FIG. 16 is a block diagram illustrating a driving controller of a display apparatus according to an embodiment of the invention.

FIG. 16 is a block diagram illustrating a driving controller 200C of a display apparatus according to an embodiment of the invention.

An embodiment of the display apparatus including the driving controller of FIG. 16 is substantially the same as embodiments of the display apparatus described above referring to FIGS. 1 to 12 except that the driving controller further includes a pattern determiner. Thus, the same reference numerals will be used to refer to the same or like elements as those described above with reference to FIGS. 1 to 12 and any repetitive detailed description thereof will be omitted or simplified.

Referring to FIGS. 1, 2, 4 to 12 and 16, an embodiment of the display apparatus includes a display panel 100 and a display panel driver. The display panel driver drives the display panel 100. The display panel driver includes a driving controller 200C, a gate driver 300, a gamma reference voltage generator 400 and a data driver 500.

The display panel driver (e.g. the driving controller 200C) may determine at least one selected from the first low luminance pattern including a first low luminance area LLA1 at a first end portion of the display panel 100 in the vertical direction and a second low luminance area LLA2 at a second end portion of the display panel 100 in the vertical direction and the second low luminance pattern including a third low luminance area LLA3 at a first end portion of the display panel 100 in the horizontal direction and a fourth low luminance area LLA4 at a second end portion of the display panel 100 in the horizontal direction.

When the first low luminance pattern is determined, the display panel driver may determine a first compensation area CAL including a first boundary between the first low luminance area LLA1 and a first normal area and a second compensation area CA2 including a second boundary between the second low luminance area LLA2 and the first normal area and operate a compensation for reducing grayscale values of the first compensation area CA1 and the second compensation area CA2.

When the second low luminance pattern is determined, the display panel driver may determine a third compensation area CA3 including a third boundary between the third low luminance area LLA3 and a second normal area and a fourth compensation area CA4 including a fourth boundary between the fourth low luminance area LLA4 and the second normal area and operate a compensation for reducing grayscale values of the third compensation area CA3 and the fourth compensation area CA4.

In an embodiment, as shown in FIG. 16, the display panel driver (e.g. the driving controller 200C) may include a block operator 210, a low luminance area determiner 220, a pattern determiner 260, a compensation determiner 230 and a luminance compensator 240. The block operator 210 may divide the input image data IMG into the plurality of blocks corresponding to the display panel 100 and calculate the average grayscale value of the block. The low luminance area determiner 220 may determine the low luminance area based on the average grayscale value of each block. The pattern determiner 260 may determine whether the input image data IMG represent a predetermined exceptional pattern. The compensation determiner 230 may determine at least one selected from the first low luminance pattern and the second low luminance pattern based on the low luminance area and whether the input image data IMG represent the predetermined exceptional pattern. When the first low luminance pattern is determined, the luminance compensator 240 may operate the compensation for reducing the grayscale values of the first compensation area and the second compensation area. When the second low luminance pattern is determined, the luminance compensator 240 may operate the compensation for reducing the grayscale values of the third compensation area and the fourth compensation area.

In an embodiment, the display panel driver may determine at least one selected from the first low luminance pattern and the second low luminance pattern based on whether a grayscale value of a present frame of the input image data IMG is less than a grayscale threshold value and whether an image of the present frame of the input image data IMG is not the predetermined exceptional pattern.

In an embodiment, for example, the exceptional pattern may be a test pattern for testing the display panel 100. In an embodiment, for example, the test pattern may be a single color pattern, a mixed color pattern, a rectangular pattern, a horizontal stripe pattern, a vertical stripe pattern, and so on. When the display panel 100 displays the test pattern, the compensation of the image may not be desired even if there are low luminance areas at opposing end portions in the vertical direction or at opposing end portions in the horizontal direction.

Thus, in an embodiment of the invention, only when the image of the present frame does not represent the exceptional pattern, the compensation determiner 230 may normally operate.

In an embodiment, the display panel driver may determine at least one selected from the first low luminance pattern and the second low luminance pattern based on whether the grayscale value of the present frame of the input image data IMG is less than the grayscale threshold value, whether an absolute value of a difference between the grayscale value of the present frame and a grayscale value of a previous frame is less than a grayscale difference threshold value and whether the image of the present frame of the input image data IMG is not the predetermined exceptional pattern.

According to an embodiment, the display panel driver may determine the low luminance pattern including the low luminance areas LLA1 and LLA2 or LLA3 and LLA4 disposed on opposing sides of the display panel 100 in the vertical direction or in the horizontal direction. When the display panel driver determines the low luminance pattern, the display panel driver may determine an area including the boundary between the low luminance area LLA1 and LLA2 or LLA3 and LLA4 and the normal area as the compensation area CA1 and CA2 or CA3 and CA4 and may operate a compensation for reducing the grayscale value of the compensation area CA1 and CA2 or CA3 and CA4.

When the low luminance areas LLA1 and LLA2 or LLA3 and LLA4 are disposed on opposing sides of the display panel 100 in the vertical direction or in the horizontal direction, the luminance of the boundary between the low luminance area LLA1 and LLA2 or LLA3 and LLA4 and the normal area may be reduced so that the afterimage occurred at the boundary between the low luminance area LLA1 and LLA2 or LLA3 and LLA4 and the normal area may be reduced. Thus, the display quality of the display panel 100 may be enhanced.

Figure 17:
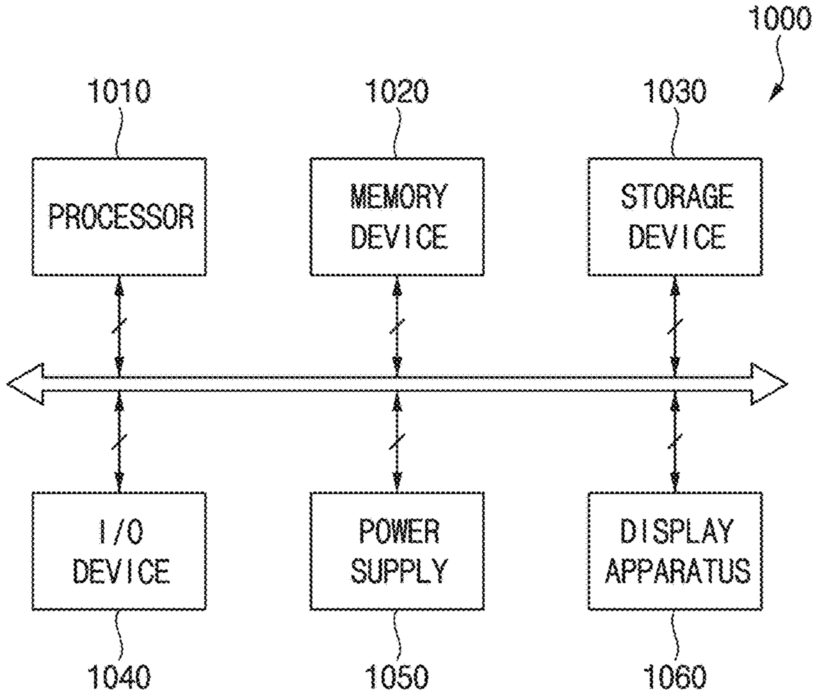
FIG. 17 is a block diagram illustrating an electronic apparatus according to an embodiment of the invention.

FIG. 17 is a block diagram illustrating an electronic apparatus according to an embodiment of the invention.

Figure 18:
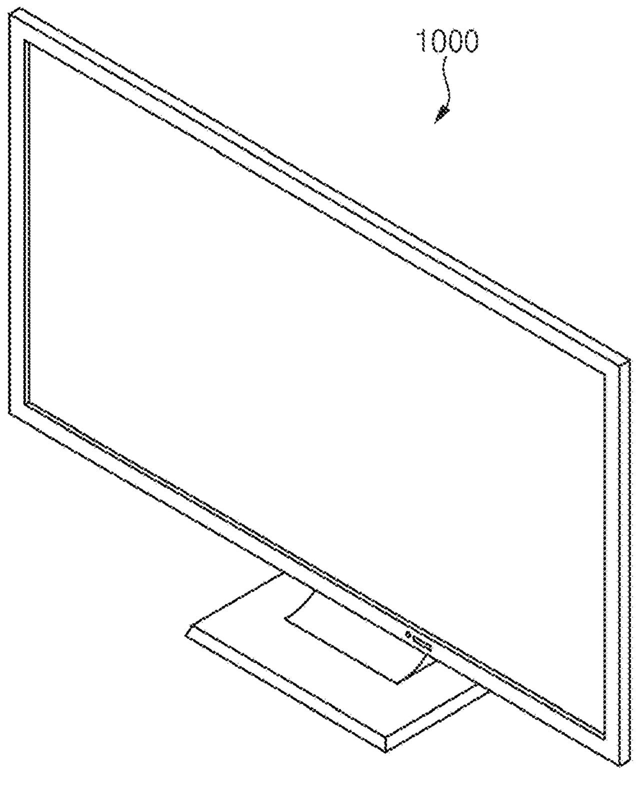
FIG. 18 is a diagram illustrating an example in which the electronic apparatus of FIG. 17 is implemented as a monitor.

FIG. 18 is a diagram illustrating an example in which the electronic apparatus of FIG. 17 is implemented as a monitor.

Referring to FIGS. 17 and 18, an embodiment of the electronic apparatus 1000 may include a processor 1010, a memory device 1020, a storage device 1030, an input/output (I/O) device 1040, a power supply 1050, and a display apparatus 1060. In such an embodiment, the display apparatus 1060 may correspond to the display apparatus of FIG. 1. In an embodiment, the electronic apparatus 1000 may further include a plurality of ports for communicating with a video card, a sound card, a memory card, a universal serial bus (USB) device, other electronic apparatuses, etc.

In an embodiment, as illustrated in FIG. 18, the electronic apparatus 1000 may be implemented as a monitor. However, the electronic apparatus 1000 is not limited thereto. In an embodiment, for example, the electronic apparatus 1000 may be implemented as a television, a cellular phone, a video phone, a smart pad, a smart watch, a tablet PC, a car navigation system, a laptop, a head mounted display (HMD) device, or the like.

The processor 1010 may perform various computing functions or various tasks. The processor 1010 may be a micro-processor, a central processing unit (CPU), an application processor (AP), or the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, or the like and/or at least one volatile memory device such as a dynamic random access memory (DRAM) device, a static random access memory (SRAM) device, a mobile DRAM device, or the like.

The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, or the like and an output device such as a printer, a speaker, or the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 19:
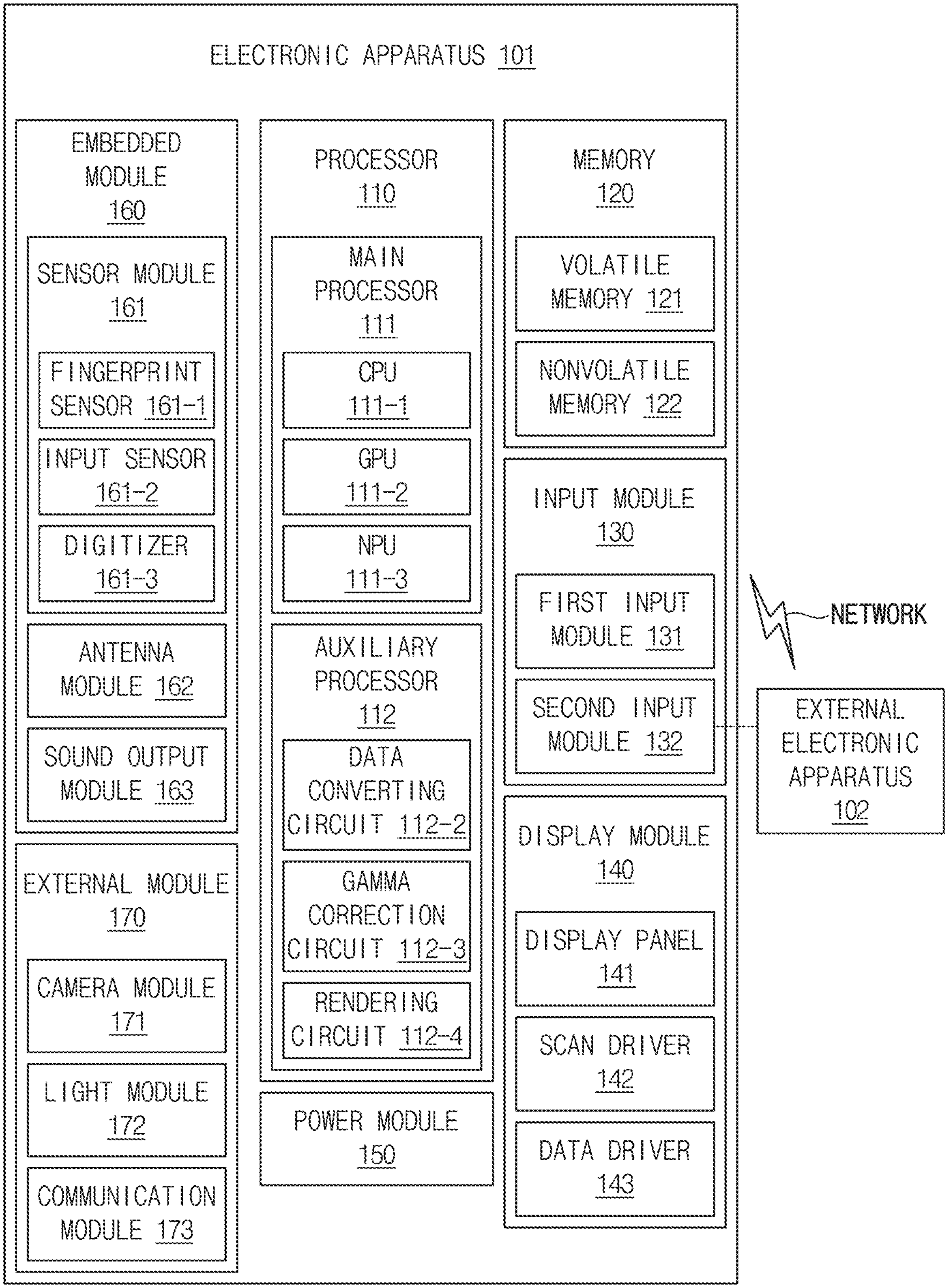
FIG. 19 is a block diagram illustrating an electronic apparatus according to an embodiment of the invention.

FIG. 19 is a block diagram illustrating an electronic apparatus 101 according to an embodiment of the invention.

Referring to FIGS. 1 to 19, an embodiment of an electronic apparatus 101 outputs various information through a display module 140 in an operating system. When a processor 110 executes an application stored in a memory 120, the display module 140 provides application information to a user through a display panel 141.

The processor 110 obtains an external input through an input module 130 or a sensor module 161 and executes an application corresponding to the external input. For example, when the user selects a camera icon displayed on the display panel 141, the processor 110 obtains a user input through an input sensor 161-2 and activates a camera module 171. The processor 110 transfers image data corresponding to a captured image obtained through the camera module 171 to the display module 140. The display module 140 may display an image corresponding to the captured image through the display panel 141.

In an embodiment, when a personal information authentication is executed in the display module 140, a fingerprint sensor 161-1 obtains input fingerprint information as input data. The processor 110 compares input data obtained through the fingerprint sensor 161-1 with authentication data stored in the memory 120, and executes an application according to a comparison result. The display module 140 may display information executed according to application logic through the display panel 141.

In an embodiment, when a music streaming icon displayed on the display module 140 is selected, the processor 110 obtains a user input through the input sensor 161-2 and activates a music streaming application stored in the memory 120. When a music execution command is input in the music streaming application, the processor 110 activates a sound output module 163 to provide sound information corresponding to the music execution command to the user.

In the above, the operation of the electronic apparatus 101 is briefly described. Hereinafter, a configuration of the electronic apparatus 101 is described in detail. Some of elements of the electronic apparatus 101 described later may be integrated and provided as one element, or one element may be separated as two or more elements.

The electronic apparatus 101 may communicate with an external electronic apparatus 102 through a network (e.g. a short-range wireless communication network or a long-range wireless communication network). According to an embodiment, the electronic apparatus 101 may include the processor 110, the memory 120, the input module 130, the display module 140, a power module 150, an embedded module 160, and an external module 170. According to an embodiment, in the electronic apparatus 101, at least one selected from the above-described elements may be omitted or one or more other apparatus may be added. According to an embodiment, some of the above-described elements (e.g., the sensor module 161, an antenna module 162 or the sound output module 163) may be integrated into another element (e.g. the display module 140).

The processor 110 may execute software to control at least one other element (e.g. hardware or software element) of the electronic apparatus 101 connected to the processor 110 and to perform various data processing or operations. According to an embodiment, as at least part of the data processing or the operations, the processor 110 may store receive instructions or data from other elements (e.g. the input module 130, the sensor module 161 or a communication module 173) in a volatile memory 121, may process the instructions or data stored in the volatile memory 121 and may store result data of the processing in a nonvolatile memory 122.

The processor 110 may include a main processor 111 and an auxiliary processor 112. The main processor 111 may include at least one selected from a central processing unit (CPU) 111-1 and an application processor (AP). The main processor 111 may further include at least one selected from a graphic processing unit (GPU) 111-2, a communication processor (CP) and an image signal processor (ISP). The main processor 111 may further include a neural processing unit (NPU) 111-3. The neural network processing unit 111-3 is a processor specialized in processing an artificial intelligence model. The artificial intelligence model may be generated through a machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN) and a deep Q-networks or a combination of two or more of the above. However, the artificial neural network is not limited to the above examples. The artificial intelligence model may include software structures, in addition to hardware structures or instead of the hardware structures. At least two of the above-described processing units and the above-described processors may be implemented as an integrated element (e.g. a single chip) or each may be implemented as independent elements (e.g. in a plurality of chips).

The auxiliary processor 112 may include a controller. The controller may include an interface conversion circuit and a timing control circuit. The controller receives an image signal from the main processor 111, converts a data format of the image signal to meet interface specifications with the display module 140, and outputs image data. The controller may output various control signals for driving the display module 140.

The auxiliary processor 112 may further include a data converting circuit 112-2, a gamma correction circuit 112-3 and a rendering circuit 112-4. The data converting circuit 112-2 may receive the image data from the controller and may compensate the image data such that the image is displayed with a desired luminance based on characteristics of the electronic apparatus 101 or a user setting or may convert the image data to reduce a power consumption or compensate for afterimages. The gamma correction circuit 112-3 may convert the image data or a gamma reference voltage such that the image displayed on the electronic apparatus 101 has desired gamma characteristics. The rendering circuit 112-4 may receive the image data from the controller and may render the image data based on a pixel arrangement of the display panel 141 included in the electronic apparatus 101. At least one selected from the data converting circuit 112-2, the gamma correction circuit 112-3 and the rendering circuit 112-4 may be integrated into another element (e.g. the main processor 111 or the controller). At least one selected from the data converting circuit 112-2, the gamma correction circuit 112-3 and the rendering circuit 112-4 may be integrated into a data driver 143 to be described later.

The memory 120 may store various data used by at least one element (e.g. the processor 110 or the sensor module 161) of the electronic apparatus 101 and input data or output data for commands related thereto. The memory 120 may include at least one selected from the volatile memory 121 and the nonvolatile memory 122.

The input module 130 may receive commands or data used to the elements (e.g. the processor 110, the sensor module 161 or the sound output module 163) of the electronic apparatus 101 from the outside of the electronic apparatus 101 (e.g. the user or the external electronic apparatus 102).

The input module 130 may include a first input module 131 for receiving commands or data from the user and a second input module 132 for receiving commands or data from the external electronic apparatus 102. The first input module 131 may include a microphone, a mouse, a keyboard, a key (e.g. a button) or a pen (e.g. a passive pen or an active pen). The second input module 132 may support a designated protocol capable of connecting to the external electronic apparatus 102 by wire or wirelessly. According to an embodiment, the second input module 132 may include a high definition multimedia interface (HDMI), a universal serial bus (USB) interface, an SD card interface or an audio interface. The second input module 132 may include a connector physically connected to the external electronic apparatus 102, for example, an HDMI connector, a USB connector, an SD card connector, or an audio connector (e.g. a headphone connector).

The display module 140 visually provides information to the user. The display module 140 may include the display panel 141, a scan driver 142 and the data driver 143. The display module 140 may further include a window, a chassis and a bracket to protect the display panel 141.

The display panel 141 may include a liquid crystal display panel, an organic light emitting display panel or an inorganic light emitting display panel. A type of the display panel 141 is not particularly limited. The display panel 141 may be a rigid type or a flexible type capable of being rolled or folded. The display module 140 may further include a supporter or a heat dissipation member supporting the display panel 141.

In an embodiment, the scan driver 142 may be mounted on the display panel 141 as a driving chip. Alternatively, the scan driver 142 may be integrated on the display panel 141. In an embodiment, for example, the scan driver 142 may include an amorphous silicon TFT gate driver circuit (ASG) integrated on the display panel 141, a low temperature polycrystaline silicon (LTPS) TFT gate driver circuit integrated on the display panel 141, or an oxide semiconductor TFT gate driver circuit (OSG) integrated on the display panel 141. The scan driver 142 receives a control signal from the controller and outputs the scan signals to the display panel 141 in response to the control signal.

The display module 140 may further include a light emission driver. The light emission driver outputs a light emission control signal to the display panel 141 in response to a control signal received from the controller. In an embodiment, the light emission driver may be separately provided or formed independently from the scan driver 142. Alternatively, the light emission driver and the scan driver 142 may be integrally formed with each other as a single chip.

The data driver 143 receives a control signal from the controller and converts the image data into an analog voltage (e.g. the data voltage) and output the data voltages to the display panel 141 in response to the control signal.

The data driver 143 may be integrated into another element (e.g. the controller). The functions of the interface conversion circuit and the timing control circuit of the controller described above may be integrated into the data driver 143.

The display module 140 may further include a voltage generating circuit. The voltage generating circuit may output various voltages for driving the display panel 141.

The power module 150 supplies power to elements of the electronic apparatus 101. The power module 150 may include a battery which supplies a power voltage. The battery may include a non-rechargeable primary cell, a rechargeable secondary cell or a fuel cell. The power module 150 may include a power management integrated circuit (PMIC). The PMIC supplies optimized power to each of the above-described modules and modules described later. The power module 150 may include a wireless power transmission/reception member electrically connected to the battery. The wireless power transmission/reception member may include a plurality of antenna radiators in a form of coils.

The electronic apparatus 101 may further include the embedded module 160 and the external module 170. The embedded module 160 may include the sensor module 161, the antenna module 162 and the sound output module 163. The external module 170 may include the camera module 171, a light module 172 and the communication module 173.

The sensor module 161 may detect an input by a user's body or an input by the pen among the first input module 131, and generate an electrical signal or data value corresponding to the input. The sensor module 161 may include at least one selected from the fingerprint sensor 161-1, the input sensor 161-2 and a digitizer 161-3.

The fingerprint sensor 161-1 may generate a data value corresponding to a user's fingerprint. The fingerprint sensor 161-1 may include an optical fingerprint sensor or a capacitive fingerprint sensor.

The input sensor 161-2 may generate data values corresponding to coordinate information of the input by the user's body or the input by the pen. The input sensor 161-2 generates a capacitance change due to an input as a data value. The input sensor 161-2 may detect an input by the passive pen or transmit/receive data to/from the active pen.

The input sensor 161-2 may measure bio signals such as a blood pressure, a moisture, or a body fat. For example, when a user touches a part of his body to a sensor layer or a sensing panel and does not move for a certain period of time, the input sensor 161-2 may detect the bio signal based on a change in an electric field caused by the part of the body so that the display module 140 may output user's desired information.

The digitizer 161-3 may generate a data value corresponding to the coordinate information input by the pen. The digitizer 161-3 generates an amount of electromagnetic change by the input as a data value. The digitizer 161-3 may detect an input by the passive pen or transmit/receive data to/from the active pen.

At least one selected from the fingerprint sensor 161-1, the input sensor 161-2 and the digitizer 161-3 may be formed as a sensor layer on the display panel 141 through a continuous process. The fingerprint sensor 161-1, the input sensor 161-2 and the digitizer 161-3 may be disposed on the display panel 141. At least one selected from the fingerprint sensor 161-1, the input sensor 161-2 and the digitizer 161-3, for example, the digitizer 161-3, may be disposed under the display panel 141.

At least two or more of the fingerprint sensor 161-1, the input sensor 161-2 and the digitizer 161-3 may be integrated into the sensing panel through the same process. When at least two or more of the fingerprint sensor 161-1, the input sensor 161-2 and the digitizer 161-3 are integrated into the sensing panel, the sensing panel may be disposed between the display panel 141 and a window disposed over an upper surface of the display panel 141. According to an embodiment, the sensing panel may be disposed on the window. The invention may not be limited to a position of the sensing panel.

At least one selected from the fingerprint sensor 161-1, the input sensor 161-2 and the digitizer 161-3 may be embedded in the display panel 141. For example, at least one selected from the fingerprint sensor 161-1, the input sensor 161-2 and the digitizer 161-3 is formed simultaneously with the display panel 141 through a process of forming elements included in the display panel 141 (e.g. light emitting elements, transistors, etc.).

In addition, the sensor module 161 may generate an electrical signal or a data value corresponding to an internal state or an external state of the electronic apparatus 101. For example, the sensor module 161 may further include a gesture sensor, a gyro sensor, a barometric pressure sensor, a magnetic sensor, an acceleration sensor, a grip sensor, a proximity sensor, a color sensor, an infrared (IR) sensor, a biosensor, a temperature sensor, a humidity sensor or an illuminance sensor.

The antenna module 162 may include one or more antennas for transmitting a signal or power to outside or for receiving a signal or power from outside. According to an embodiment, the communication module 173 may transmit a signal to an external electronic apparatus or receive a signal from an external electronic apparatus through an antenna suitable for a communication method. An antenna pattern of the antenna module 162 may be integrated with an element of the display module 140 (e.g. the display panel 141) or the input sensor 161-2.

The sound output module 163 is a device for outputting sound signals to the outside of the electronic apparatus 101. For example, the sound output module 163 may include a speaker used for general purposes such as playing multimedia or recording and a receiver used exclusively for receiving a call. According to an embodiment, the receiver may be formed integrally with or separately from the speaker. A sound output pattern of the sound output module 163 may be integrated with the display module 140.

The camera module 171 may capture still images and moving images. According to an embodiment, the camera module 171 may include one or more lenses, an image sensor or an image signal processor. The camera module 171 may further include an infrared camera capable of determining a presence or an absence of a user, the user's location and the user's gaze.

The light module 172 may provide a light. The light module 172 may include a light emitting diode or a xenon lamp. The light module 172 may operate in conjunction with the camera module 171 or operate independently.

The communication module 173 may support establishment of a wired or wireless communication channel between the electronic apparatus 101 and the external electronic apparatus 102 and communication through the established communication channel. The communication module 173 may include one or both of a wireless communication module such as a cellular communication module, a short-distance wireless communication module, or a global navigation satellite system (GNSS) communication module and a wired communication module such as a local area network (LAN) communication module, or a power line communication module. The communication module 173 may communicate with the external electronic apparatus 102 through a short-range communication network such as Bluetooth, WiFi direct or infrared data association (IrDA) or a long-distance communication network such as a cellular network, the Internet, or a computer network (e.g. LAN or WAN). The various types of communication modules 173 described above may be implemented as a single chip or may be implemented as separate chips.

The input module 130, the sensor module 161 and the camera module 171 may be used to control the operation of the display module 140 in conjunction with the processor 110.

The processor 110 outputs commands or data to the display module 140, the sound output module 163, the camera module 171 or the light module 172 based on the input data received from the input module 130. For example, the processor 110 may generate image data corresponding to input data applied through a mouse or an active pen, and output the generated image data to the display module 140 or the processor 110 may generate command data corresponding to the input data and output the generated command data to the camera module 171 or the light module 172. When input data is not received from the input module 130 for a certain period of time, the processor 110 converts an operation mode of the electronic apparatus 101 into a low power mode or a sleep mode so that a power consumption of the electronic apparatus 101 may be reduced.

The processor 110 outputs commands or data to the display module 140, the sound output module 163, the camera module 171 or the light module 172 based on sensed data received from the sensor module 161. For example, the processor 110 may compare authentication data applied by the fingerprint sensor 161-1 with authentication data stored in the memory 120, and then execute an application according to the comparison result. The processor 110 may execute commands or output corresponding image data to the display module 140 based on the sensed data sensed by the input sensor 161-2 or the digitizer 161-3. When the sensor module 161 includes a temperature sensor, the processor 110 may receive temperature data for the temperature measured from the sensor module 161 and may further perform luminance correction on the image data based on the temperature data.

The processor 110 may receive determined data about the presence or the absence of the user, the user's location and the user's gaze from the camera module 171. The processor 110 may further perform luminance correction on the image data based on the determined data. For example, the processor 110, which determines the presence or the absence of the user through an input from the camera module 171, may display image data having the luminance corrected by the data converting circuit 112-2 or the gamma correction circuit 112-3 to the display module 140.

Some of the above elements may be connected to each other through a communication method between peripheral devices such as a bus, a general purpose input/output (GPIO), a serial peripheral interface (SPI), a mobile industry processor interface (MIPI), or an ultra path interconnect (UPI) link to exchange signals (e.g. commands or data) with each other. The processor 110 may communicate with the display module 140 through an agreed interface. For example, the processor 110 may communicate with the display module 140 through any one of the above communication methods. The invention may not be limited to the above communication methods.

The electronic apparatus 101 according to various embodiments disclosed in the disclosure may be various types of apparatuses. For example, the electronic apparatus 101 may include at least one selected from a monitor, a portable communication apparatus (e.g. a smart phone), a computer apparatus, a portable multimedia apparatus, a portable medical apparatus, a camera, a wearable device and a home appliance. The electronic apparatus 101 according to an embodiment of the disclosure may not be limited to the aforementioned apparatuses.

In an embodiment, the display panel 141 of FIG. 19 may correspond to embodiments of the display panel 100 described herein. For example, the display panel 100 of FIG. 1 may correspond to the display panel 141 of FIG. 19. For example, the driving controller 200 of FIG. 1 may correspond to the controller of the auxiliary processor 112 of FIG. 19. For example, the gate driver 300 of FIG. 1 may correspond to the scan driver 142 of FIG. 19. For example, the data driver 500 of FIG. 1 may correspond to the data driver 143 of FIG. 19.

According to embodiments of the display apparatus, the method of driving the display panel using the display apparatus and the electronic apparatus including the display apparatus, the afterimage of the display panel may be reduced so that the display quality of the display panel may be enhanced.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display apparatus comprising:

a display panel; and a display panel driver which drives the display panel, wherein the display panel driver determines at least one selected from a first low luminance pattern and a second low luminance pattern, wherein the first low luminance pattern includes a first low luminance area at a first end portion of the display panel in a vertical direction and a second low luminance area at a second end portion of the display panel in the vertical direction, and the second low luminance pattern includes a third low luminance area at a first end portion of the display panel in a horizontal direction and a fourth low luminance area at a second end portion of the display panel in the horizontal direction, wherein when the first low luminance pattern is determined, the display panel driver determines a first compensation area including a first boundary between the first low luminance area and a first normal area and a second compensation area including a second boundary between the second low luminance area and the first normal area and operates a compensation for reducing grayscale values of the first compensation area and the second compensation area, and wherein when the second low luminance pattern is determined, the display panel driver determines a third compensation area including a third boundary between the third low luminance area and a second normal area and a fourth compensation area including a fourth boundary between the fourth low luminance area and the second normal area and operates a compensation for reducing grayscale values of the third compensation area and the fourth compensation area.

2. The display apparatus of claim 1, wherein the display panel driver determines at least one selected from the first low luminance pattern and the second low luminance pattern based on whether a grayscale value of a present frame of input image data is less than a grayscale threshold value.

3. The display apparatus of claim 2, wherein the display panel driver divides the input image data into a plurality of blocks corresponding to the display panel, and wherein when an average grayscale value of a block among the plurality of blocks maintains below the grayscale threshold value for a predetermined time period, the display panel driver determines the block as a low luminance block.

4. The display apparatus of claim 3, wherein when the average grayscale value of the block is less than the grayscale threshold value, the display panel driver increases a block count value of the block, and wherein when the average grayscale value of the block is greater than or equal to the grayscale threshold value, the display panel driver decreases the block count value of the block.

5. The display apparatus of claim 3, wherein when a number of the low luminance block in a block row is greater than or equal to a first number threshold value, the display panel driver determines the block row as a low luminance block row.

6. The display apparatus of claim 5, wherein when low luminance block rows are symmetrically disposed at the first end portion of the display panel in the vertical direction and the second end portion of the display panel in the vertical direction, the first low luminance pattern is determined.

7. The display apparatus of claim 3, wherein when a number of the low luminance block in a block column is greater than or equal to a second number threshold value, the display panel driver determines the block column as a low luminance block column.

8. The display apparatus of claim 7, wherein when low luminance block columns are symmetrically disposed at the first end portion of the display panel in the horizontal direction and the second end portion of the display panel in the horizontal direction, the second low luminance pattern is determined.

9. The display apparatus of claim 1, wherein the display panel driver determines at least one selected from the first low luminance pattern and the second low luminance pattern based on whether a grayscale value of a present frame of input image data is less than a grayscale threshold value and whether an absolute value of a difference between the grayscale value of the present frame and a grayscale value of a previous frame is less than a grayscale difference threshold value.

10. The display apparatus of claim 1, wherein the display panel driver determined at least one selected from the first low luminance pattern and the second low luminance pattern based on whether a grayscale value of a present frame of input image data is less than a grayscale threshold value and whether an image of the present frame of the input image data is not a predetermined exceptional pattern.

11. The display apparatus of claim 10, wherein when a uniformity of a grayscale histogram of the present frame of the input image data is less than a uniformity threshold value, the display panel driver determines the image of the present frame as the predetermined exceptional pattern.

12. The display apparatus of claim 1, wherein the display panel driver determines at least one selected from the first low luminance pattern and the second low luminance pattern based on whether a grayscale value of a present frame of input image data is less than a grayscale threshold value, whether an absolute value of a difference between the grayscale value of the present frame and a grayscale value of a previous frame is less than a grayscale difference threshold value and whether an image of the present frame of the input image data is not a predetermined exceptional pattern.

13. The display apparatus of claim 1, wherein a size of the first compensation area is greater than a size of the first low luminance area, and wherein a size of the second compensation area is greater than a size of the second low luminance area.

14. The display apparatus of claim 1, wherein a compensation degree in the first compensation area gradually decreases as being away from the first boundary to the first normal area and gradually decreases as being away from the second boundary to the first normal area.

15. The display apparatus of claim 1, wherein a size of the third compensation area is greater than a size of the third low luminance area, and wherein a size of the fourth compensation area is greater than a size of the fourth low luminance area.

16. The display apparatus of claim 1, wherein a compensation degree in the third compensation area gradually decreases as being away from the third boundary to the second normal area and gradually decreases as being away from the fourth boundary to the second normal area.

17. The display apparatus of claim 1, wherein the display panel divides input image data into a plurality of blocks corresponding to the display panel, and wherein the display panel driver determines whether each of the plurality of blocks is a low luminance block based on an average grayscale value thereof.

18. The display apparatus of claim 17, wherein the display panel driver determines whether the low luminance block forms at least one selected from a low luminance block row and a low luminance block column.

19. The display apparatus of claim 18, wherein when low luminance block rows are symmetrically disposed at the first end portion of the display panel in the vertical direction and the second end portion of the display panel in the vertical direction, the first low luminance pattern is determined, and wherein when low luminance block columns are symmetrically disposed at the first end portion of the display panel in the horizontal direction and the second end portion of the display panel in the horizontal direction, the second low luminance pattern is determined.

20. The display apparatus of claim 1, wherein the display panel driver comprises:

a block operator which divides input image data into a plurality of blocks corresponding to the display panel and calculates an average grayscale value of each of the plurality of blocks;

a low luminance area determiner which determines a low luminance area based on the average grayscale value of each of the plurality of blocks;

a compensation determiner which determines at least one selected from the first low luminance pattern and the second low luminance pattern based on the low luminance area; and a luminance compensator which operates a compensation for reducing the grayscale values of the first compensation area and the second compensation area when the first low luminance pattern is determined and operates a compensation for reducing the grayscale values of the third compensation area and the fourth compensation area when the second low luminance pattern is determined.

21. The display apparatus of claim 20, wherein the display panel driver further comprises:

a pixel shifter which periodically shifts the input image data in the horizontal direction of the display panel when the second low luminance pattern is determined.

22. The display apparatus of claim 1, wherein the display panel driver comprises:

a block operator which divides input image data into a plurality of blocks corresponding to the display panel and calculates an average grayscale value of each of the plurality of blocks;

a pattern determiner which determines whether the input image data represent a predetermined exceptional pattern;

a low luminance area determiner which determines a low luminance area based on the average grayscale value of each of the plurality of blocks and whether the input image data represent the predetermined exceptional pattern;

a compensation determiner which determines at least one selected from the first low luminance pattern and the second low luminance pattern based on the low luminance area; and a luminance compensator which operates a compensation for reducing the grayscale values of the first compensation area and the second compensation area when the first low luminance pattern is determined and operates a compensation for reducing the grayscale values of the third compensation area and the fourth compensation area when the second low luminance pattern is determined.

23. The display apparatus of claim 1, wherein the display panel driver comprises:

a block operator which divides input image data into a plurality of blocks corresponding to the display panel and calculates an average grayscale value of each of the plurality of blocks;

a low luminance area determiner which determines a low luminance area based on the average grayscale value of each of the plurality of blocks;

a pattern determiner which determines whether the input image data represent a predetermined exceptional pattern;

a compensation determiner which determines at least one selected from the first low luminance pattern and the second low luminance pattern based on the low luminance area and whether the input image data represent the predetermined exceptional pattern; and a luminance compensator which operates a compensation for reducing the grayscale values of the first compensation area and the second compensation area when the first low luminance pattern is determined and operates a compensation for reducing the grayscale values of the third compensation area and the fourth compensation area when the second low luminance pattern is determined.

24. A display apparatus comprising:

a display panel; and a display panel driver which drives the display panel, wherein the display panel driver determines a low luminance pattern including a first low luminance area at a first end portion of the display panel in a vertical direction and a second low luminance area at a second end portion of the display panel in the vertical direction, and wherein when the low luminance pattern is determined, the display panel driver determines a first compensation area including a first boundary between the first low luminance area and a normal area and a second compensation area including a second boundary between the second low luminance area and the normal area and operates a compensation for reducing grayscale values of the first compensation area and the second compensation area.

25. A display apparatus comprising:

a display panel; and a display panel driver which drives the display panel, wherein the display panel driver determines a low luminance pattern including a first low luminance area at a first end portion of the display panel in a horizontal direction and a second low luminance area at a second end portion of the display panel in the horizontal direction, and wherein when the low luminance pattern is determined, the display panel driver determines a first compensation area including a first boundary between the first low luminance area and a normal area and a second compensation area including a second boundary between the second low luminance area and the normal area and operates a compensation for reducing grayscale values of the first compensation area and the second compensation area.

26. A method of driving a display panel, the method comprising:

determining at least one selected from a first low luminance pattern and a second low luminance pattern, wherein the first low luminance pattern includes a first low luminance area at a first end portion of the display panel in a vertical direction and a second low luminance area at a second end portion of the display panel in the vertical direction, and the second low luminance pattern includes a third low luminance area at a first end portion of the display panel in a horizontal direction and a fourth low luminance area at a second end portion of the display panel in the horizontal direction;

determining a first compensation area including a first boundary between the first low luminance area and a first normal area and a second compensation area including a second boundary between the second low luminance area and the first normal area, and operating a compensation for reducing grayscale values of the first compensation area and the second compensation area when the first low luminance pattern is determined; and determining a third compensation area including a third boundary between the third low luminance area and a second normal area and a fourth compensation area including a fourth boundary between the fourth low luminance area and the second normal area, and operating a compensation for reducing grayscale values of the third compensation area and the fourth compensation area when the second low luminance pattern is determined.

27. An electronic apparatus comprising:

an application processor;

a display panel; and a display panel driver which receives input image data from the application processor and drives the display panel, wherein the display panel driver determines at least one selected from a first low luminance pattern and a second low luminance pattern, wherein the first low luminance pattern includes a first low luminance area at a first end portion of the display panel in a vertical direction and a second low luminance area at a second end portion of the display panel in the vertical direction, and the second low luminance pattern includes a third low luminance area at a first end portion of the display panel in a horizontal direction and a fourth low luminance area at a second end portion of the display panel in the horizontal direction, wherein when the first low luminance pattern is determined, the display panel driver determines a first compensation area including a first boundary between the first low luminance area and a first normal area and a second compensation area including a second boundary between the second low luminance area and the first normal area and operates a compensation for reducing grayscale values of the first compensation area and the second compensation area, and wherein when the second low luminance pattern is determined, the display panel driver determines a third compensation area including a third boundary between the third low luminance area and a second normal area and a fourth compensation area including a fourth boundary between the fourth low luminance area and the second normal area and operates a compensation for reducing grayscale values of the third compensation area and the fourth compensation area.

* * * * *